US012652474B2

(12) United States Patent
Kim et al.

(10) Patent No.: US 12,652,474 B2
(45) Date of Patent: Jun. 9, 2026

(54) IMAGE SENSOR

(71) Applicant: SAMSUNG ELECTRONICS CO., LTD., Suwon-si (KR)

(72) Inventors: Kyungmin Kim, Suwon-si (KR); Chanho Chun, Suwon-si (KR); Minsun Keel, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 18/970,387

(22) Filed: Dec. 5, 2024

(65) Prior Publication Data

US 2025/0294265 A1 Sep. 18, 2025

(30) Foreign Application Priority Data

Mar. 18, 2024 (KR) ........................ 10-2024-0037387

(51) Int. Cl.
*H04N 25/68* (2023.01)
*H04N 17/00* (2006.01)
*H04N 25/76* (2023.01)

(52) U.S. Cl.
CPC ........... *H04N 25/68* (2023.01); *H04N 17/002* (2013.01); *H04N 25/7795* (2023.01)

(58) Field of Classification Search
CPC .. H04N 25/68; H04N 17/002; H04N 25/7795; H04N 25/69; H04N 25/76; H04N 25/779; H04N 25/745; H04N 25/79
USPC ........................................................ 348/294
See application file for complete search history.

(56) References Cited

U.S. PATENT DOCUMENTS

| | | | |
|---|---|---|---|
| 9,769,402 B2 | 9/2017 | Koh et al. | |
| 10,467,731 B2 * | 11/2019 | Manbeck | H04N 5/145 |
| 10,819,928 B2 | 10/2020 | Kawazu et al. | |
| 10,939,094 B2 | 3/2021 | Chua et al. | |
| 11,330,212 B2 | 5/2022 | Kawazu et al. | |
| 11,381,773 B2 | 7/2022 | Matsuura et al. | |
| 11,438,573 B2 | 9/2022 | Oberoi et al. | |
| 11,558,568 B2 | 1/2023 | Kawazu et al. | |
| 11,627,265 B2 | 4/2023 | Na et al. | |
| 11,778,298 B2 * | 10/2023 | Sozawa | H04N 23/54 |
| | | | 348/294 |
| 12,432,338 B1 * | 9/2025 | Lu | H04N 17/002 |
| 2012/0033097 A1 * | 2/2012 | Lim | H03K 21/023 |
| | | | 348/222.1 |

(Continued)

FOREIGN PATENT DOCUMENTS

WO 2022/207368 A1 10/2022

*Primary Examiner* — Usman A Khan
(74) *Attorney, Agent, or Firm* — Sughrue Mion, PLLC

(57) ABSTRACT

An image sensor is provided. The image sensor includes: a pixel array with a pixel area and a dummy area; a row driver configured to sequentially output driving signals to the pixel array; a detection circuit configured to receive a row output signals generated based on the driving signals from the dummy area, and receive the driving signals; and a timing controller configured to provide the driving signals to the row driver, and the driving signals and a clock signal to the detection circuit. The detection circuit is further configured to identify difference values between delay times corresponding to adjacent rows of the rows, determine whether the rows are defective by comparing the difference values with a reference value, and output result values indicating whether the rows are defective.

20 Claims, 17 Drawing Sheets

(56)	References Cited

U.S. PATENT DOCUMENTS

2013/0248684 A1*	9/2013	Yun ...................... H10F 39/803
250/208.1
2021/0337150 A1*	10/2021	Segura Puchades .. H04N 25/76
2023/0007192 A1*	1/2023	Lee ...................... H04N 25/532
2023/0156355 A1*	5/2023	Kim ...................... H04N 25/47
348/135
2023/0164455 A1	5/2023	Oka et al.

* cited by examiner

FIG. 9

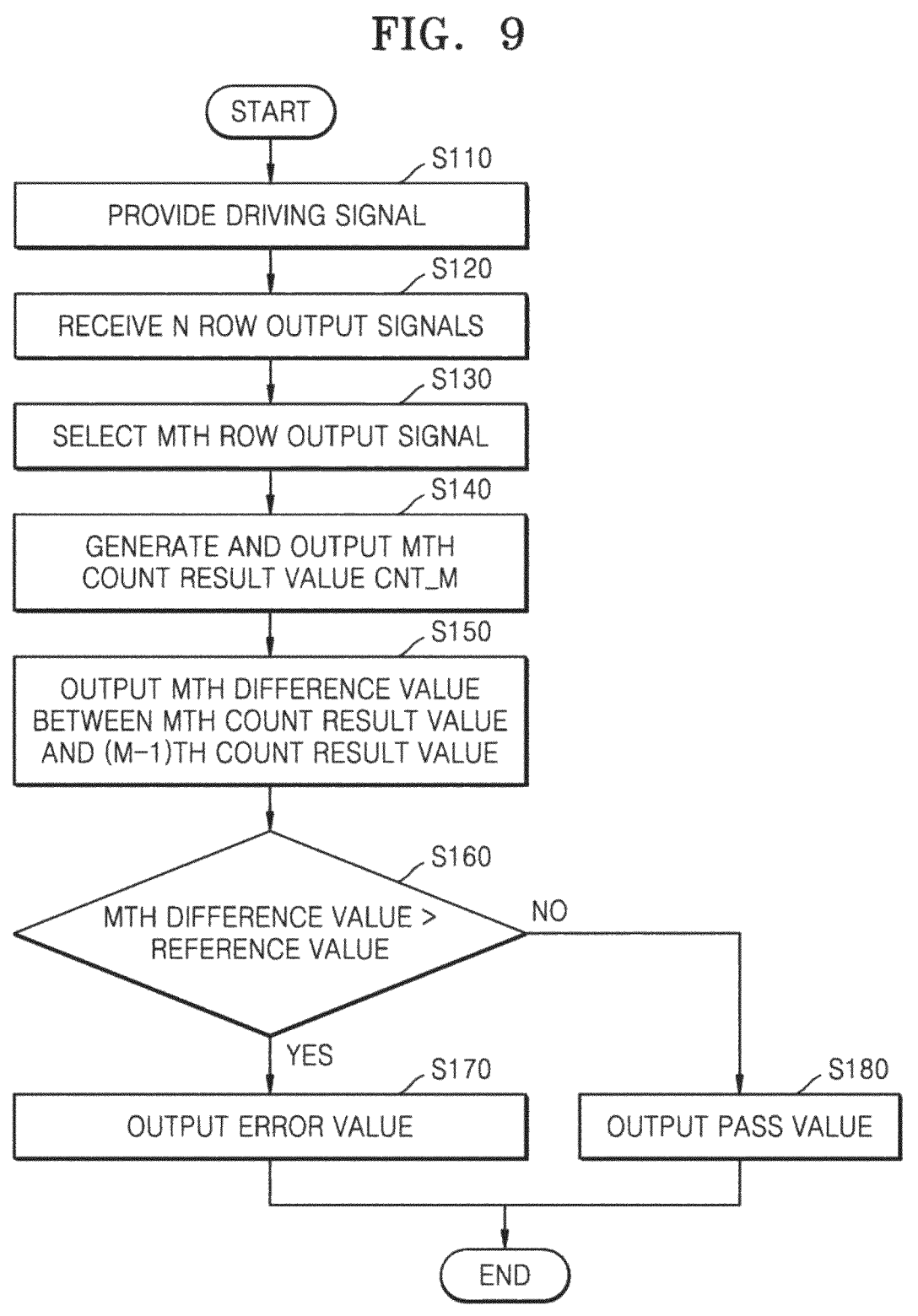

START

S110

PROVIDE DRIVING SIGNAL

S120

RECEIVE N ROW OUTPUT SIGNALS

S130

SELECT MTH ROW OUTPUT SIGNAL

S140

GENERATE AND OUTPUT MTH
COUNT RESULT VALUE CNT_M

S150

OUTPUT MTH DIFFERENCE VALUE
BETWEEN MTH COUNT RESULT VALUE
AND (M-1)TH COUNT RESULT VALUE

S160

MTH DIFFERENCE VALUE >
REFERENCE VALUE

NO

YES

S170

OUTPUT ERROR VALUE

S180

OUTPUT PASS VALUE

END

Detection Circuit

IMAGE SENSOR

CROSS-REFERENCE TO RELATED APPLICATION

This application claims priority under 35 U.S.C. § 119 to Korean Patent Application No. 10-2024-0037387, filed on Mar. 18, 2024, in the Korean Intellectual Property Office, the disclosure of which is incorporated by reference herein in its entirety.

BACKGROUND

The present disclosure relates to an image sensor, and more particularly, to an image sensor capable of detecting a row of a defective or faulty pixel array.

Image sensors are devices that capture a two-dimensional or three-dimensional images of an object. Image sensors generate an image of an object by using a photoelectric conversion device that reacts according to the intensity of light reflected by or emitted from the object. Recently, with the development of the computer and communication industries, the demand for image sensors with improved performance has increased in various electronic devices such as digital cameras, camcorders, personal communication systems (PCSs), gaming devices, security cameras, medical micro cameras, mobile phones, etc.

Image sensors may include a pixel array including a plurality of pixels and a row driver driving rows of the pixels. When an error occurs in a driving signal output from the row driver or a signal transfer line, image sensors may not normally operate.

SUMMARY

One or more example embodiments provide an image sensor capable of generating a count result value by counting cycles of a clock signal in a time interval in which a selected Mth row output signal is delayed compared to a driving signal, generating a difference value between a previous count result value and the count result value, comparing the difference value with a reference value, and determining whether a selected row is faulty.

According to an aspect of an example embodiment, an image sensor includes: a pixel array including a pixel area and a dummy area adjacent to and on a same plane as the pixel area, the pixel area including pixels provided in a plurality of rows; a row driver configured to sequentially output driving signals to the pixel array; a detection circuit configured to receive a plurality of row output signals generated based on the driving signals from the dummy area, and receive the driving signals; and a timing controller configured to provide the driving signals to the row driver, and the driving signals and a clock signal to the detection circuit. The detection circuit is further configured to identify difference values between delay times corresponding to adjacent rows of the plurality of rows, determine whether the plurality of rows are defective by comparing the difference values with a reference value, and output result values indicating whether the plurality of rows are defective.

According to another aspect of an example embodiment, an image sensor includes: a pixel array including a pixel area and a dummy area, the pixel area including a plurality of pixels; a row driver configured to output a driving signal to the pixel array; and a detection circuit configured to receive a plurality of row output signals from the dummy area, and receive the driving signal and a clock signal. The detection circuit includes: a signal selection circuit configured to select an Nth row output signal from among the plurality of row output signals; a counter circuit configured to generate an Nth count result value by counting cycles of the clock signal during a time interval of the Nth row output signal based on the driving signal; a difference circuit configured to generate an Nth difference value between the Nth count result value and an (N−1)th count result value; and a comparison circuit configured to detect a defect of the Nth row output signal by comparing the Nth difference value with a reference value. The time interval include a delay interval in which the Nth row output signal is delayed based on the driving signal.

According to another aspect of an example embodiment, a method of operating an image sensor, includes: receiving a driving signal; receiving a plurality of row output signals; selecting an Nth row output signal from among the plurality of row output signals; generating an Nth count result value by counting cycles of a clock signal during a delayed time interval between the driving signal and the Nth row output signal; generating an Nth difference value between the Nth count result value and an (N−1)th count result value; comparing the Nth difference value with a reference value; and detecting that the Nth row output signal is faulty based on the Nth difference value being greater than the reference value.

BRIEF DESCRIPTION OF DRAWINGS

The above and other aspects will be more apparent from the following description of example embodiments taken in conjunction with the accompanying drawings, in which:

FIG. 9 is a flowchart illustrating a method of operating an image sensor according to an example embodiment;

DETAILED DESCRIPTION

Figure 1:
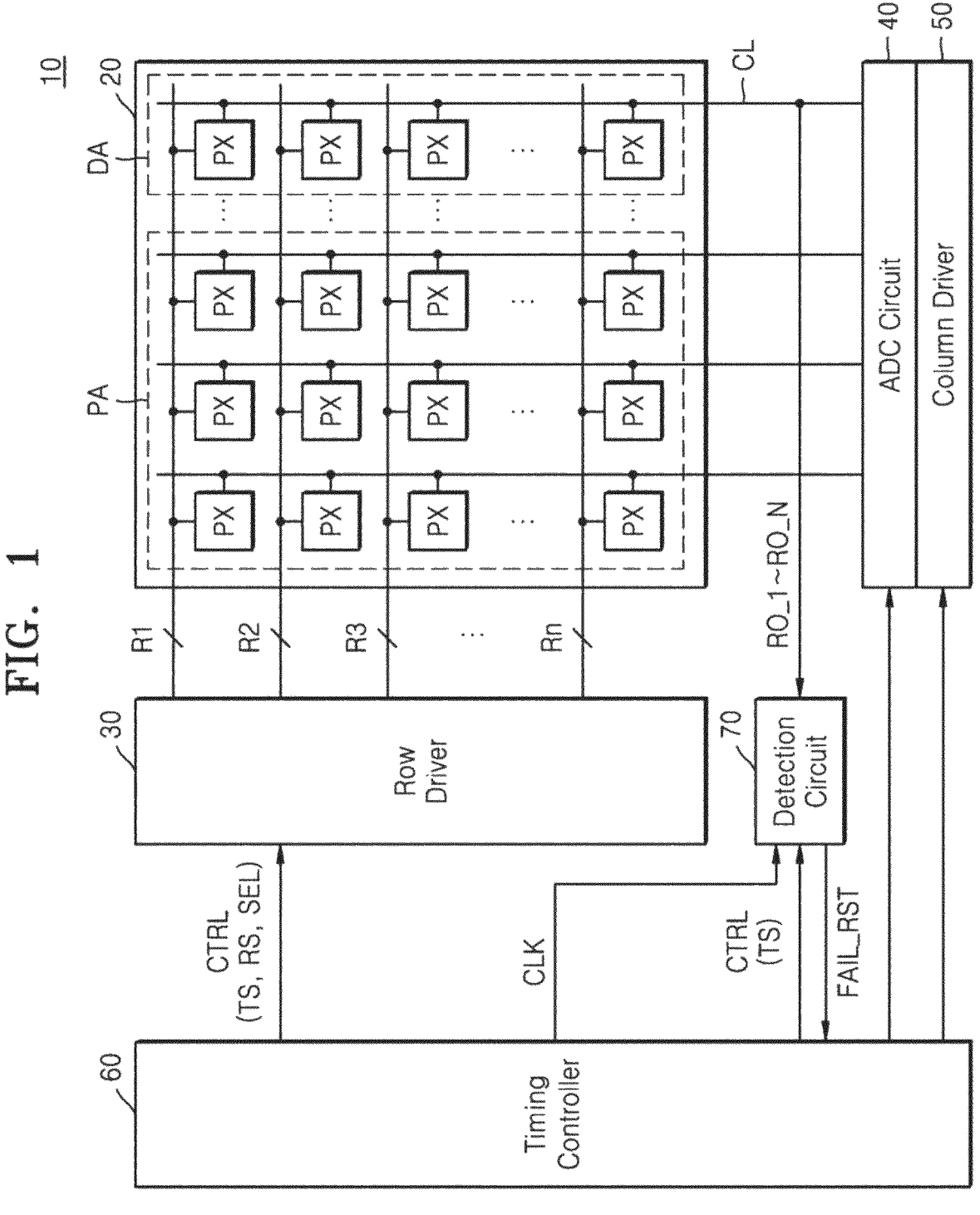
FIG. 1 is a block diagram illustrating an image sensor according to an example embodiment.

Hereinafter, example embodiments will be described in detail with reference to the attached drawings. Like components are denoted by like reference numerals throughout the specification, and repeated descriptions thereof are omitted. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

FIG. 1 is a block diagram illustrating an image sensor 10 according to an example embodiment.

The image sensor 10 may be mounted on an electronic device having an image or light sensing function. For example, the image sensor 10 may be mounted on an electronic device, such as a camera, a smartphone, a wearable device, an Internet of Things (IoT) device, a home appliance, a tablet personal computer (PC), a personal digital assistant (PDA), a portable multimedia player (PMP), navigation, drone, an advanced driver assistance system (ADAS), etc. In addition, the image sensor 10 may be mounted on an electronic device provided as a component in vehicle, furniture, manufacturing facility, door, various measurement devices, etc.

Referring to FIG. 1, the image sensor 10 may include a pixel array 20, a row driver 30, a timing controller 60, an analog-to-digital conversion circuit 40 (hereinafter referred to as an ADC circuit), a column driver 50, and a detection circuit 70.

The timing controller 60 may control the row driver 30, the ADC circuit 40, the column driver 50, and the detection circuit 70. The timing controller 60 may output a driving signal CTRL to each of the row driver 30, the ADC circuit 40, the column driver 50, and the detection circuit 70 to control operations or timing of the row driver 30, the ADC circuit 40, the column driver 50, and the detection circuit 70. The timing controller 60 may output a clock signal CLK to the detection circuit 70. In an example embodiment, the timing controller 60 may include control logic, a phase lock loop (PLL) circuit, a communication interface circuit, etc. In an example embodiment, the timing controller 60 may output the driving signal CTRL to the row driver 30 and the detection circuit 70. The driving signal CTRL may include a first driving signal TS, a second driving signal RS, and a third driving signal SEL, the first driving signal TS may be a transfer control signal of a pixel PX, the second driving signal RS may be a reset signal of the pixel PX, and the third driving signal SEL may be a selection signal SEL of the pixel PX.

In an example embodiment, it is described that the detection circuit 70 and the row driver 30 detect defects or faults in a plurality of row lines R1 to Rn by receiving the first driving signal TS.

The pixel array 20 may include a pixel area PA and a dummy area DA. The dummy area DA may be disposed adjacent to the pixel area PA on the same plane as the pixel area PA. The pixel array 20 may include the plurality of row lines R1 to Rn (where n is a natural number of 2 or more), a plurality of column lines CL, and a plurality of pixels PX connected to the plurality of row lines R1 to Rn and the plurality of column lines CL and disposed in rows and columns. In an example embodiment, the image sensor 10 may be an active pixel sensor (APS).

The dummy area DA may output the first driving signal TS and a first row output signal RO_1 to an Nth row output signal RO_N. The first driving signal TS and the plurality of row output signals RO_1 to RO_N may be connected to the detection circuit 70 extending in a column direction.

Each of the plurality of pixels PX may include at least one photoelectric conversion device, and the pixel PX may detect light by using the photoelectric conversion device and output an image signal, which is an electrical signal according to the detected light. For example, the photoelectric conversion device may be a light detection device including an organic material or an inorganic material, such as an inorganic photodiode, an organic photodiode, a perovskite photodiode, a photo transistor, a photo gate, or a pinned photodiode. In an example embodiment, each of the plurality of pixels PX may include a plurality of photoelectric conversion devices.

The row driver 30 may drive the pixel array 20 in units of one or more rows. For example, the row driver 30 may drive one row of the pixel array 20 at a time, and the rows of the pixel array 20 may be sequentially driven. The row driver 30 may decode the driving signal CTRL (e.g., a row control signal (address signal)) received from the timing controller 60, and select at least one of row lines constituting the pixel array 20 in response to the decoded row control signal. For example, the row driver 30 may generate a selection signal that selects one of a plurality of rows. In addition, the pixel array 20 may output a pixel signal from a row selected by the selection signal provided from the row driver 30.

The row driver 30 may transmit control signals for outputting the pixel signal to the pixel array 20, and the pixel PX may output the pixel signal by operating in response to the control signals. The row driver 30 may output the driving signal CTRL to the pixel area PA and the dummy area DA of the pixel array 20.

In an example embodiment, the dummy area DA may be disposed on a first side of the pixel area PA, and the row driver 30 may be disposed on a second side opposite to the first side of the pixel area PA. In this regard, the pixel area PA may be provided between the row driver 30 and the dummy area DA.

The ADC circuit 40 may be connected to the column line CL of the pixel array 20 and may convert an analog signal output from the pixel array 20 into a digital signal. For example, the ADC circuit 40 may be an analog-to-digital converter converting analog signals to digital signals.

The ADC circuit 40 may include a plurality of correlated double sampling (CDS) circuits and a plurality of counters. The ADC circuit 40 may convert a pixel signal (e.g., pixel voltage) input from the pixel array 20 into a pixel value that is a digital signal. The pixel signal received through each of the plurality of column lines CL may be converted into a pixel value, which is a digital signal, by the CDS circuit and the counter.

The column driver 50 may output sequentially output data of digital signals from the ADC circuit 40. The column driver 50 may temporarily store the pixel value output from the ADC circuit 40 and then output the pixel value. For example, the column driver 50 may include a plurality of column memories (or buffers) and a column decoder. The column memory may store the received pixel value. A plurality of pixel values stored in the plurality of column memories may be output as image data by the control of the column decoder.

The detection circuit 70 may receive the driving signal CTRL from the timing controller 60 and the plurality of row output signals RO_1 to RO_N from the pixel array 20. For example, the detection circuit 70 may receive the first driving signal TS from the timing controller 60 and the plurality of row output signals RO_1 to RO_N from the dummy area DA. The detection circuit 70 may detect horizontal fixed pattern noise (HFPN) of the pixel array 20 based on the plurality of row output signals RO_1 to RO_N and the first driving signal TS. When the HFPN occurs, the detection circuit 70 may output an error signal FAIL_RST to the timing controller 60. For example, the HFPN occurs, the timing controller 60 may generate an error message and display the error message to a user. For example, when the image sensor 10 is used as a front camera or a rear camera of vehicle, the timing controller 60 may notify the user of the HFPN to prevent an accident.

The detection circuit 70 may receive the first driving signal TS and the plurality of row output signals RO_1 to RO_N, select one of the plurality of row output signals RO_1 to RO_N based on the first driving signal TS, and detect whether the selected row output signal is faulty. For example, the detection circuit 70 may select a third row output signal from among the plurality of row output signals RO_1 to RO_N, and count cycles of a clock signal CLK in a time interval in which receiving the third row output signal by the detection circuit 70 is delayed based on the first driving signal TS, thereby generating a count result value.

The detection circuit 70 may generate a difference value between the count result value and a previous count result value, and compare the difference value with a reference value to detect a defect in the selected row. For example, if the difference value exceeds the reference value, the selected row may include a defect. The detection circuit 70 may generate an error message or a fail message with respect to the defect in the selected row and display the error message or the fail message on the timing controller 60 to notify the user. For example, when the image sensor 10 is in a test stage, the timing controller 60 may notify a manufacturer that the selected row is faulty or defective, and when the image sensor 10 is used as a front camera or a rear camera of vehicle, notify a driver that the selected row is faulty or defective. That is, the detection circuit 70 may detect whether the selected row is faulty among row defects that are HFPNs of the pixel array 20. When the selected row is faulty, the detection circuit 70 may detect whether a pixel in the selected row is faulty.

Figure 2:
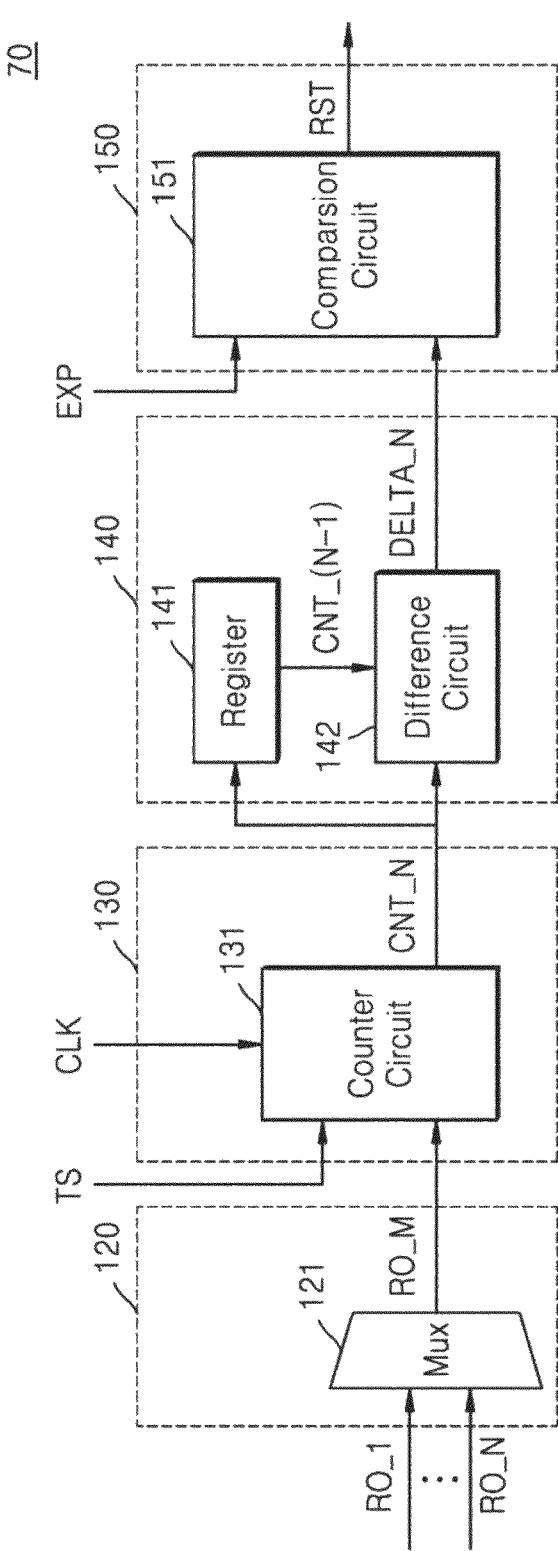
FIG. 2 is a circuit diagram illustrating a detection circuit according to an example embodiment.

FIG. 2 illustrates the detection circuit 70 receives the first driving signal TS and the plurality of row output signals RO_1 to RO_N from the dummy area DA, but this is only an example, and the detection circuit 70 may receive the first driving signal TS and the plurality of row output signals RO_1 to RO_N from the pixel area PA in a different example embodiment.

A detailed description of the detection circuit 70 is described below with reference to FIG. 2.

FIG. 2 is a circuit diagram illustrating the detection circuit 70 according to an example embodiment.

Referring to FIG. 2, the detection circuit 70 may include a row output signal selection block (i.e., row output signal selection circuit) 120, a counter block (i.e., counter circuit) 130, a difference block (i.e., difference circuit) 140, and a comparison block (i.e., comparison circuit) 150.

The row output signal selection block 120 may include a multiplexer 121. The multiplexer 121 may select one of the plurality of row output signals RO_1 to RO_N output from the pixel array 20 or the dummy area (DA in FIG. 1). The multiplexer 121 may provide the selected one row output signal, for example, an Mth row output signal RO_M (where 1<M<N), to the counter block 130.

The counter block 130 may include a counter circuit 131. The counter circuit 131 may receive a clock signal and the first driving signal TS, and receive, from the multiplexer 121, the Mth row output signal RO_M. The counter circuit 131 may count cycles of the clock signal CLK in a specific time interval of the Mth row output signal RO_M based on the first driving signal TS, thereby generating a count result value CNT_N. The time interval may be defined as a time length for which the Mth row output signal RO_M is delayed compared to the first driving signal TS. The time interval may also be referred to as duration.

According to an example embodiment, a method of counting cycles of the clock signal CLK in at least one time interval of the Mth row output signal RO_M may be selected as one of two options. Hereinafter, the counter block 130 may receive the first driving signal TS and the Mth row output signal RO_M, the first driving signal TS may be a signal that repeatedly rises or falls in each row driving interval and transitions between a logic high level and a logic low level, and the Mth row output signal RO_M may be a signal that rises in the Mth row driving interval. For example, a first option may be a method of counting cycles of the clock signal CLK in a time interval in which the Mth row output signal RO_M is delayed compared to the first driving signal TS in the selected row, and a second option may be a method of counting cycles of the clock signal CLK in a time interval in which the Mth row output signal RO_M first toggles from a logic low level to a logic high level in the selected row. A method of identifying time intervals is described below with reference to FIGS. 6 and 7.

According to an example embodiment, a time interval in which a count operation is performed, that is, the time interval of the Mth row output signal RO_M, may be performed according to whether a row of a pixel array is selected.

According to an example embodiment, the counter circuit 131 may count cycles of the clock signal CLK in a specific time interval in which the Mth row output signal RO_M is delayed compared to the first driving signal TS, thereby generating the count result value CNT_N. Alternatively, the counter circuit 131 may count cycles of the clock signal CLK in a time interval in which the Mth row output signal RO_M first toggles from a logic low level to a logic high level in the selected row, thereby generating the count result value CNT_N.

In addition, according to an example embodiment, the counter circuit 131 may count cycles of the clock signal CLK in a time interval in which the Mth row output signal RO_M is delayed compared to the first driving signal TS in the selected row. The counter circuit 131 may count cycles of the clock signal CLK in a time interval in which the first driving signal TS is input and the Mth row output signal RO_M transitions from a logic low level to a logic high level. Assuming that the Mth row output signal RO_M is delayed by 7 us compared to the first driving signal TS and input, the counter circuit 131 may count 7, and output 7 corresponding to the count result value CNT_N.

The difference block 140 may include a register 141 and a difference circuit 142. The register 141 may receive and store the count result value CNT_N output from the counter circuit 131. The difference circuit 142 may receive a previous count result value CNT_(N−1) output from the register 141 and the count result value CNT_N output from the counter circuit 131. Here, the previous count result value CNT_(N−1) may indicate a time interval in which an (M−1)th row output signal RO_(M−1) is delayed compared to the first driving signal TS.

The difference circuit 142 may perform a subtraction operation to subtract the previous count result value CNT_(N−1) from the count result value CNT_N. The difference circuit 142 may calculate a difference between the count result value CNT_N and the previous count result value CNT_(N−1). The difference circuit 142 may generate a difference value DELTA_N by subtracting the previous count result value CNT_(N−1) from the count result value CNT_N. The difference value DELTA_N may be an absolute value obtained by subtracting the previous count result value CNT_(N−1) from the count result value CNT_N. For example, when the count result value CNT_N is 6, and the previous count result value CNT_(N−1) is 7, the difference value may be |6−7|=1.

The comparison block 150 may include a comparison circuit 151. The comparison circuit 151 may receive the difference value DELTA_N from the difference circuit 142 and a reference value EXP from the outside. The comparison circuit 151 may compare the difference value DELTA_N with the reference value EXP during a specific time interval. The comparison circuit 151 may compare the difference value DELTA_N with the reference value EXP to detect a defect of the selected row. The comparison circuit 151 may compare the difference value DELTA_N with the reference value EXP, and may output a result value RST based on the comparison.

The comparison circuit 151 may compare a magnitude or level between the difference value DELTA_N and the reference value EXP. The comparison circuit 151 may output the result value RST corresponding to a fail when the difference value DELTA_N is greater than the reference value EXP, and output the result value RST corresponding to a pass when the difference value DELTA_N is less than the reference value EXP. The comparison circuit 151 may output the result value RST corresponding to the fail to the timing controller (60 in FIG. 1) to notify a user that a defect or fault has occurred in the selected row.

For example, when the difference value DELTA_N is 1 and the reference value EXP is 2, because the difference value DELTA_N is less than the reference value EXP, the comparison circuit 151 may output the result value RST corresponding to the pass. When the difference value DELTA_N is 4, and the reference value EXP is 2, because the difference value DELTA_N is greater than the reference value EXP, the comparison circuit 151 may output the result value RST corresponding to the fail. The comparison circuit 151 may provide the result value RST corresponding to the fail to the timing controller (60 in FIG. 1), and the timing controller (60 in FIG. 1) may output an error message to notify the user that the selected row has a defect or fault.

The image sensor including the detection circuit 70 according to an example embodiment may generate the count result value CNT_N by counting cycles of the clock signal CLK in the time interval in which the selected Mth row output signal RO_M is delayed compared to the first driving signal TS, generated the difference value DELTA_N by subtracting the previous count result value CNT_(N−1) and the count result value CNT_N, and determine and detect whether the selected row is faulty by comparing the difference value DELTA_N with the reference value EXP.

Figure 3:
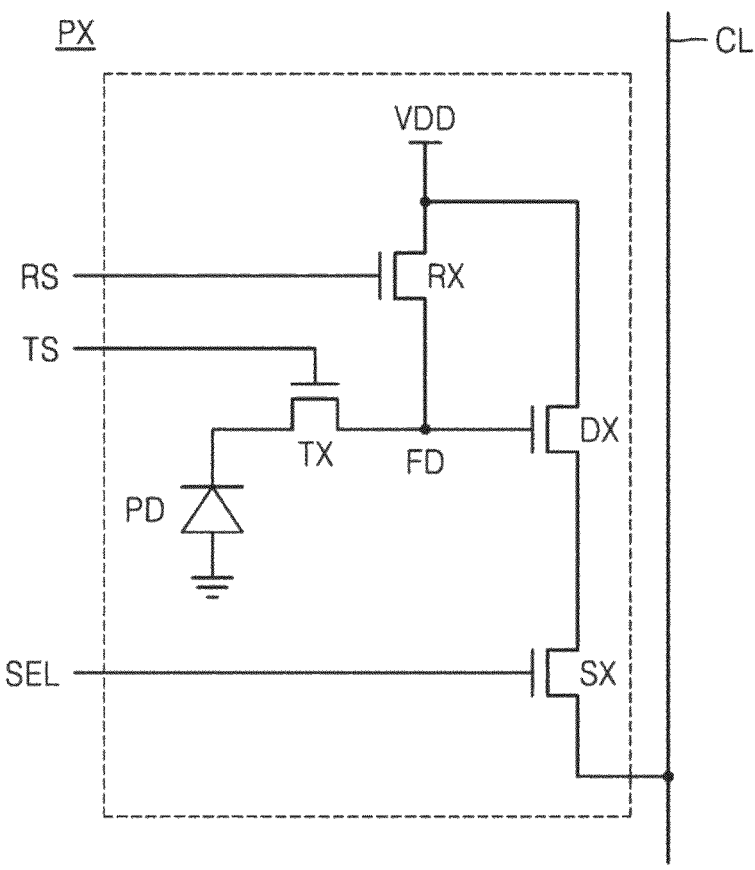
FIG. 3 is a circuit diagram of a pixel included in an image sensor according to an example embodiment.

FIG. 3 is a circuit diagram of the pixel PX included in an image sensor according to an example embodiment. The pixel PX in FIG. 3 represents an example of one of the pixels PX included in the pixel array 20 in FIG. 1.

Referring to FIG. 3, the pixel PX may include a photodiode PD, a transfer transistor TX, a reset transistor RX, a driving transistor DX, and a selection transistor SX.

The photodiode PD may be replaced with another light sensing device. The photodiode PD may also be referred to as a photoelectric conversion device. The photodiode PD may generate photocharges that vary depending on the intensity of incident light.

One end of the transfer transistor TX may be connected to the photodiode PD, and the other end thereof may be connected to a floating diffusion node FD. The transfer transistor TX may transfer photocharges from the photodiode PD to the floating diffusion node FD according to a transfer control signal TS provided to a gate of the transfer transistor TX.

One end of the driving transistor DX may be connected to the selection transistor SX, and the other end thereof may be connected to one end of the reset transistor RX. The driving transistor DX may amplify the photocharges according to a potential due to the photocharge accumulated in the floating diffusion node FD and output the photocharges through the selection transistor SX.

One end of the selection transistor SX may be connected to the driving transistor DX, and the other end thereof may be connected to one of the plurality of column lines CL. The selection control signal SEL may be provided to a gate of the selection transistor SX. The selection transistor SX may be turned on in response to the selection control signal SEL. When the selection transistor SX is turned on in response to the selection control signal SEL, a sensing signal corresponding to a voltage level of the floating diffusion node FD, that is, a light sensing signal, may be output as, for example, a pixel signal.

One end of the reset transistor RX may be connected to the floating diffusion node FD, and the other end thereof may be connected to one end of the driving transistor DX. A gate of the reset transistor RX may be turned on in response to the reset control signal RS. The gate of the reset transistor RX may reset the floating diffusion node FD based on a power supply voltage VDD according to the reset control signal RS. At this time, a reset signal corresponding to the voltage level of the floating diffusion node FD may be output as a pixel signal.

The pixel signal may be output to an ADC circuit (e.g., 40 in FIG. 1) through the column line CL. FIG. 3 illustrates the pixel PX including one photodiode PD and four transistors including the transfer transistor TX, the reset transistor RX, the driving transistor DX, and the selection transistor SX, but example embodiment are not limited thereto.

Figure 4:
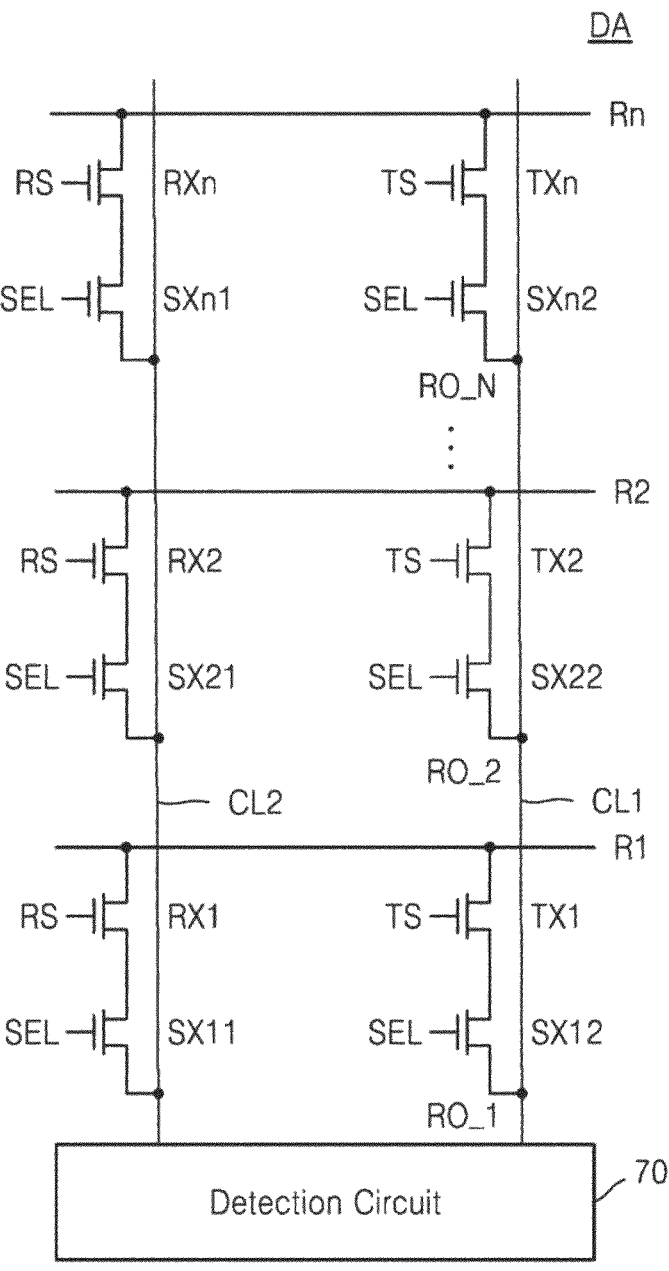
FIG. 4 is a circuit diagram illustrating a dummy area of a pixel array according to an example embodiment.

FIG. 4 is a circuit diagram illustrating the dummy area DA of a pixel array according to an example embodiment. The dummy area DA shown in FIG. 4 may correspond to the dummy area DA shown in FIG. 1.

Referring to FIGS. 3 and 4, the dummy area DA may receive the first driving signal TS. For example, the first driving signal TS may be the transfer control signal TS of the pixel PX. In addition, the dummy area DA may receive the second driving signal RS and the third driving signal SEL. For example, the second driving signal RS may be the reset control signal RS of the pixel PX, and the third driving signal SEL may be the selection control signal SEL.

Referring to FIG. 4, the dummy area DA may output the first row output signal RO_1, the second row output signal RO_2, and the Nth row output signal RO_N based on the first driving signal TS. In an example embodiment, a configuration and a method in which the dummy area DA counts cycles of the clock signal CLK in a time interval in which the first row output signal RO_1, the second row output signal RO_2, and the Nth row output signal RO_N are delayed based on the first driving signal TS are illustrated.

The dummy area DA shown in FIG. 4 may include two or more N type transistors connected in series, but example embodiments are not limited thereto.

A first row R1 of the dummy area DA may include a first reset transistor RX1 to which the second driving signal RS is applied and a first selection transistor SX11 to which the third driving signal SEL is applied, and may include a first transfer transistor TX1 to which the first driving signal TS is applied and a second selection transistor SX12 to which the third driving signal SEL is applied. The first row R1 of the dummy area DA may output a first row output signal RO_1 based on the first driving signal TS.

A second row R2 of the dummy area DA may include a first reset transistor RX2 to which the second driving signal RS is applied and a first selection transistor SX21 to which the third driving signal SEL is applied, and may include a first transfer transistor TX2 to which the first driving signal TS is applied and a second selection transistor SX22 to which the third driving signal SEL is applied. The second row R2 of the dummy area DA may output a second row output signal RO_2 based on the first driving signal TS.

An Nth row Rn of the dummy area DA may include a first reset transistor RXn to which the second driving signal RS is applied and a first selection transistor SXn1 to which the third driving signal SEL is applied, and may include a first transfer transistor TXn to which the first driving signal TS is applied and a second selection transistor SXn2 to which the third driving signal SEL is applied. The Nth row Rn of the dummy area DA may output the Nth row output signal RO_N based on the first driving signal TS.

The dummy area DA may be connected to the detection circuit 70 through the column line CL, which may include first column line CL1 and second column line CL2. The dummy area DA may output the first row output signal RO_1, the second row output signal RO_2, and the Nth row output signal RO_N to the first column line CL1 and provide the first row output signal RO_1, the second row output signal RO_2, and the Nth row output signal RO_N to the detection circuit 70, based on the first driving signal TS. The detection circuit 70 may receive the first row output signal RO_1, the second row output signal RO_2, and the Nth row output signal RO_N through the same second column line CL2.

Figure 5:
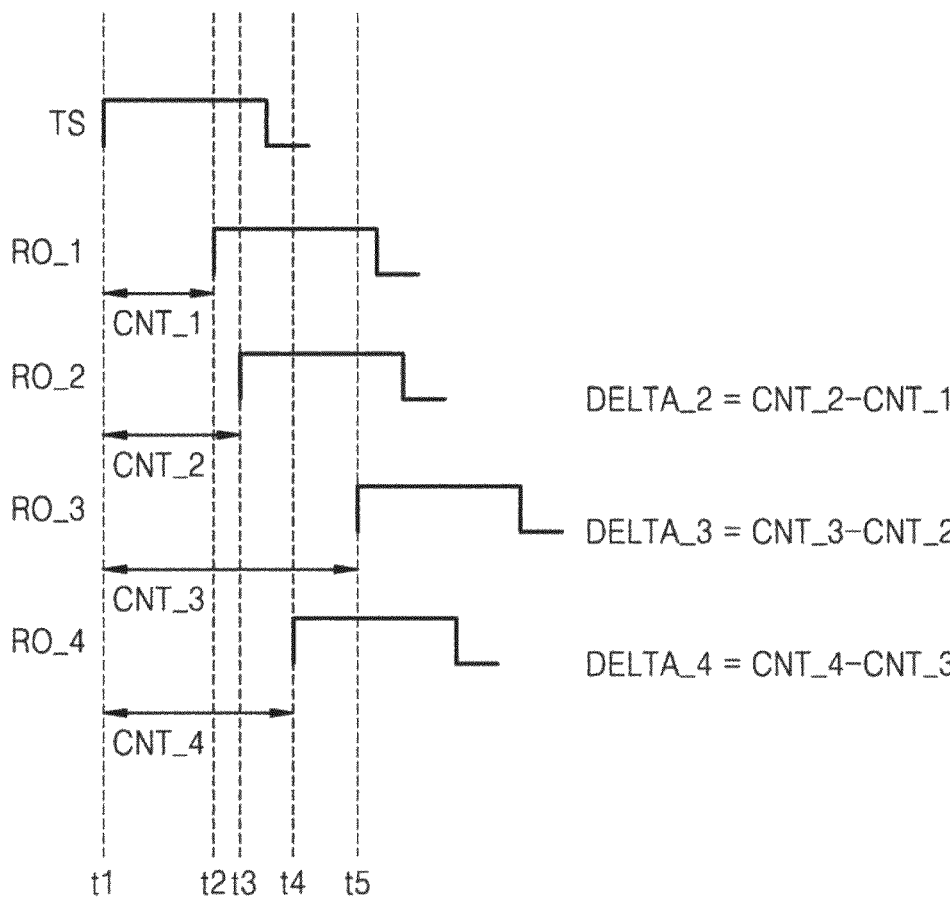
FIGS. 5 and 6 are timing diagrams illustrating a first driving signal and a plurality of row output signals received through a detection circuit according to an example embodiment.
Figure 6:
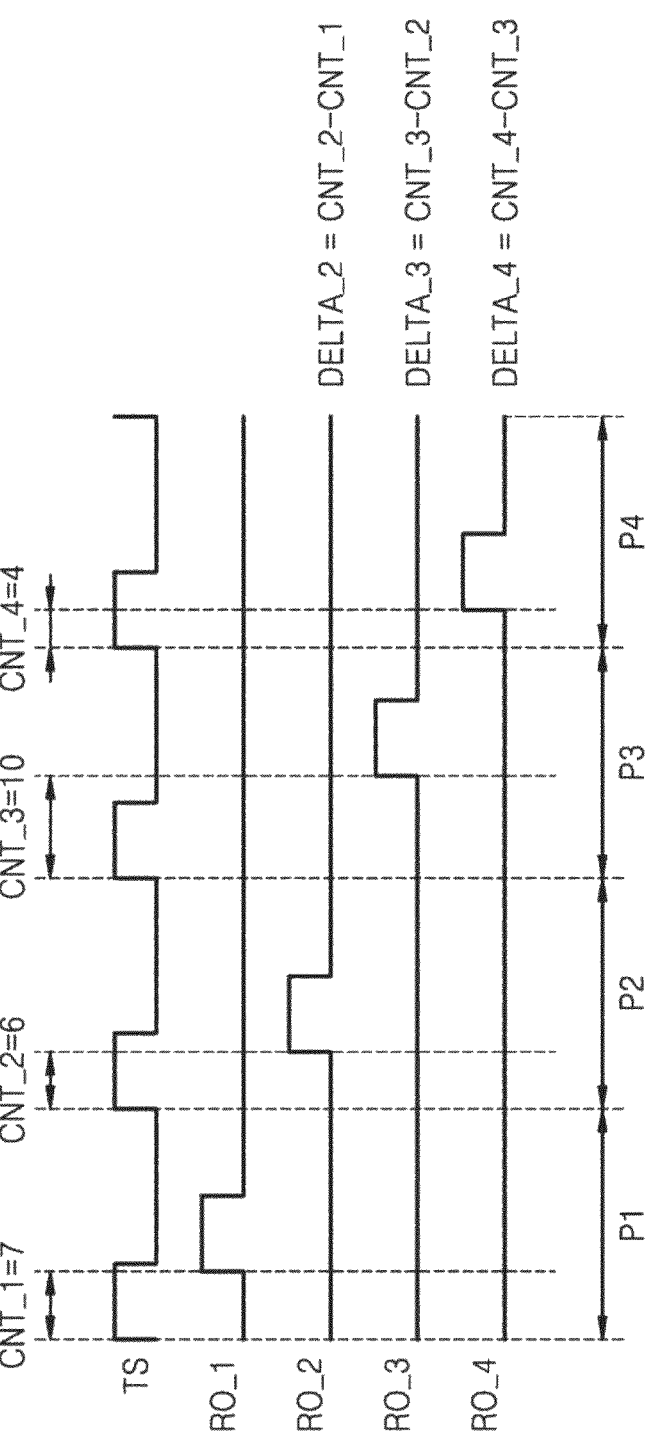

FIGS. 5 and 6 are timing diagrams illustrating the first driving signal TS and a plurality of row output signals received through a detection circuit according to an example embodiment.

FIGS. 5 and 6 are timing diagrams illustrating that the counter circuit 131 counts cycles of the clock signal CLK in time intervals and the difference circuit 142 generates difference values by using count result values.

Referring to FIGS. 5 and 6, it is assumed that the first row output signal RO_1, the second row output signal RO_2, and a fourth row output signal RO_4 are rows which are not defective, and a third row output signal RO_3 is a defective row.

Referring to FIG. 5, at a first time t1, the first driving signal TS may transition to a logic high level. At a second time t2, the first row output signal RO_1 may transition to a logic high level. At a third time t3, the second row output signal RO_2 may transition to a logic high level. At a fourth time t4, the fourth row output signal RO_4 may transition to a logic high level. At a fifth time t5, the third row output signal RO_3 may transition to a logic high level. Here, the first row output signal RO_1 to the fourth row output signal RO_4 transitioning to a logic high level may indicate that a first row to a fourth row may be selected.

Referring to FIGS. 2 and 5 together, the counter circuit 131 may count cycles of the clock signal CLK in a time interval in which the first row output signal RO_1 is delayed compared to the first driving signal TS. For example, the time interval may be from the first time t1 to the second time t2, and the counter circuit 131 may generate and output a first count result value CNT_1. The counter circuit 131 may count cycles of the clock signal CLK in a time interval in which the second row output signal RO_2 is delayed compared to the first driving signal TS. For example, the time interval may be from the first time t1 to the third time t3, and the counter circuit 131 may generate and output a second count result value CNT_2. The counter circuit 131 may count cycles of the clock signal CLK in a time interval in which the third row output signal RO_3 is delayed compared to the first driving signal TS. For example, the time interval may be from the first time tl to the fifth time t5, and the counter circuit 131 may generate and output a third count result value CNT_3. The counter circuit 131 may count cycles of the clock signal CLK in a time interval in which the fourth row output signal RO_4 is delayed compared to the first driving signal TS. For example, the time interval may be from the first time t1 to the fourth time t4, and the counter circuit 131 may generate and output a fourth count result value CNT_4.

Referring to FIGS. 2 and 5 together, the difference circuit 142 may generate and output a second difference value DELTA_2, which is a difference between the second count result value CNT_2 and the first count result value CNT_1. For example, the second difference value DELTA_2 may be a value obtained by subtracting the first count result value CNT_1 from the second count result value CNT_2. The difference circuit 142 may generate and output a third difference value DELTA_3, which is a difference between the third count result value CNT_3 and the second count result value CNT_2. For example, the third difference value DELTA_3 may be a value obtained by subtracting the second count result value CNT_2 from the third count result value CNT_3. The difference circuit 142 may generate and output a fourth difference value DELTA_4, which is a difference between the fourth count result value CNT_4 and the third count result value CNT_3. For example, the fourth difference value DELTA_4 may be a value obtained by subtracting the third count result value CNT_3 from the fourth count result value CNT_4.

The comparison circuit 151 may compare the second difference value DELTA_2 with the reference value EXP.

For example, when the second difference value DELTA_2 is less than the reference value EXP, the comparison circuit 151 may output a result value corresponding to a pass. The comparison circuit 151 may compare the third difference value DELTA_3 with the reference value EXP. When the third difference value DELTA_3 is greater than the reference value EXP, the comparison circuit 151 may output a result value corresponding to a fail. The comparison circuit 151 may compare the fourth difference value DELTA_4 with the reference value EXP. When the fourth difference value DELTA_4 is less than the reference value EXP, the comparison circuit 151 may output a result value corresponding to a pass.

The image sensor including the detection circuit 70 according to an example embodiment may generate the third count result value CNT_3 by counting cycles of the clock signal CLK in the time interval in which the selected third row output signal RO_3 is delayed compared to the first driving signal TS, and generate the third difference value DELTA_3 between the second count result value CNT_2 and the third count result value CNT_3. The image sensor including the detection circuit 70 according to an example embodiment may determine and detect whether the selected row is faulty by comparing the third difference value DELTA_3 with the reference value EXP.

Referring to FIG. 6, the first driving signal TS may transition from a logic low level to a logic high level in a first period P1, and then repeatedly transition from a logic low level to a logic high level in a second period P2, a third period P3, and a fourth period P4.

Referring to FIGS. 2 and 6 together, in the first period P1, the first driving signal TS and the first row output signal RO_1 may transition from a logic low level to a logic high level. The counter circuit 131 may count cycles of the clock signal CLK in the time interval in which the first row output signal RO_1 is delayed compared to the first driving signal TS. The counter circuit 131 may output the first count result value CNT_1. The first count result value CNT_1 may be 7.

In the second period P2, the first driving signal TS and the second row output signal RO_2 may transition from a logic low level to a logic high level. The counter circuit 131 may count cycles of the clock signal CLK in the time interval in which the second row output signal RO_2 is delayed compared to the first driving signal TS. The counter circuit 131 may output the second count result value CNT_2. The second count result value CNT_2 may be 6. The difference circuit 142 may generate and output the second difference value DELTA_2 by subtracting the first count result value CNT_1 from the second count result value CNT_2. The second difference value DELTA_2 may be |6−7|=1. The comparison circuit 151 may compare the second difference value DELTA_2 with the reference value EXP. When the reference value EXP is 2, because the second difference value DELTA_2 is less than the reference value EXP, the comparison circuit 151 may output a result value corresponding to a pass.

In the third period P3, the first driving signal TS and the third row output signal RO_3 may transition from a logic low level to a logic high level. The counter circuit 131 may count cycles of the clock signal CLK in the time interval in which the third row output signal RO_3 is delayed compared to the first driving signal TS. The counter circuit 131 may output the third count result value CNT_3. The third count result value CNT_3 may be 10. The difference circuit 142 may generate and output the third difference value DELTA_3 by subtracting the second count result value CNT_2 from the third count result value CNT_3. The third difference value DELTA_3 may be 4. The comparison circuit 151 may compare the third difference value DELTA_3 with the reference value EXP. When the reference value EXP is 2, because the third difference value DELTA_3 is greater than the reference value EXP, the comparison circuit 151 may output a result value corresponding to a fail.

In the fourth period P4, the first driving signal TS and the fourth row output signal RO_4 may transition from a logic low level to a logic high level. The counter circuit 131 may count cycles of the clock signal CLK in the time interval in which the fourth row output signal RO_4 is delayed compared to the first driving signal TS. The counter circuit 131 may output the fourth count result value CNT_4. The fourth count result value CNT_4 may be 4. The difference circuit 142 may generate and output the fourth difference value DELTA_4 by subtracting the third count result value CNT_3 from the fourth count result value CNT_4. The fourth difference value DELTA_4 may be 6. The comparison circuit 151 may compare the fourth difference value DELTA_4 with the reference value EXP. When the fourth difference value DELTA_4 is greater than the reference value EXP, the comparison circuit 151 may output a result value corresponding to a fail, and, when the fourth difference value DELTA_4 is less than the reference value EXP, the comparison circuit 151 may output a result value corresponding to a pass.

Figure 7:
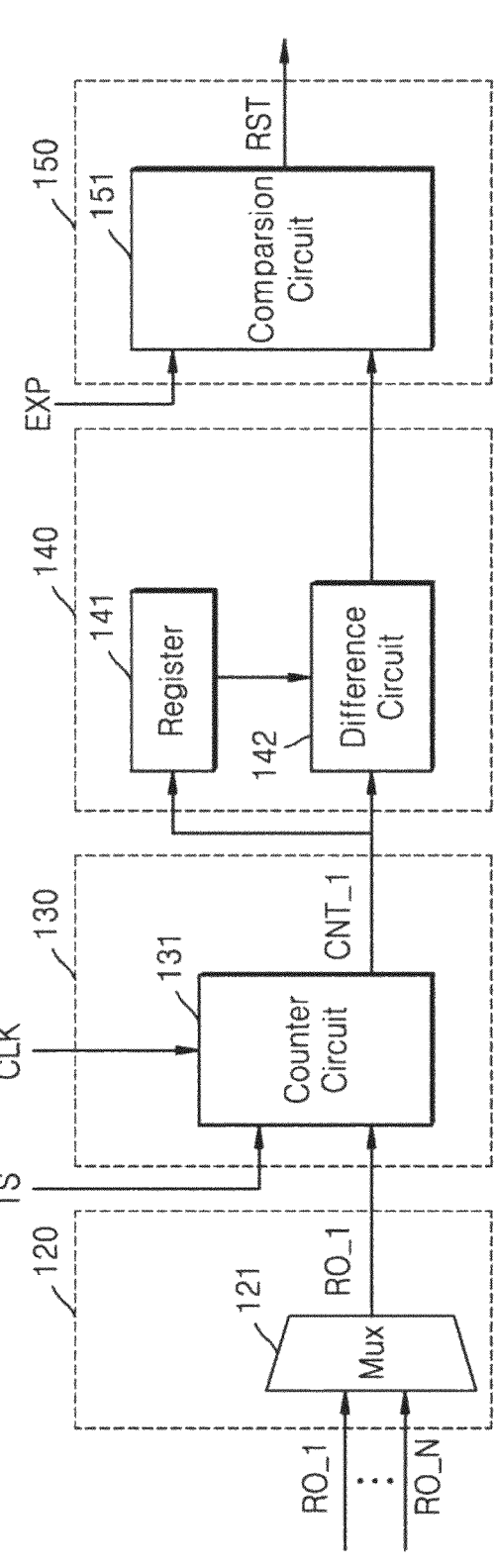
FIGS. 7 and 8 are diagrams illustrating a method of operating a detection circuit of a selected row according to an example embodiment.
Figure 8:
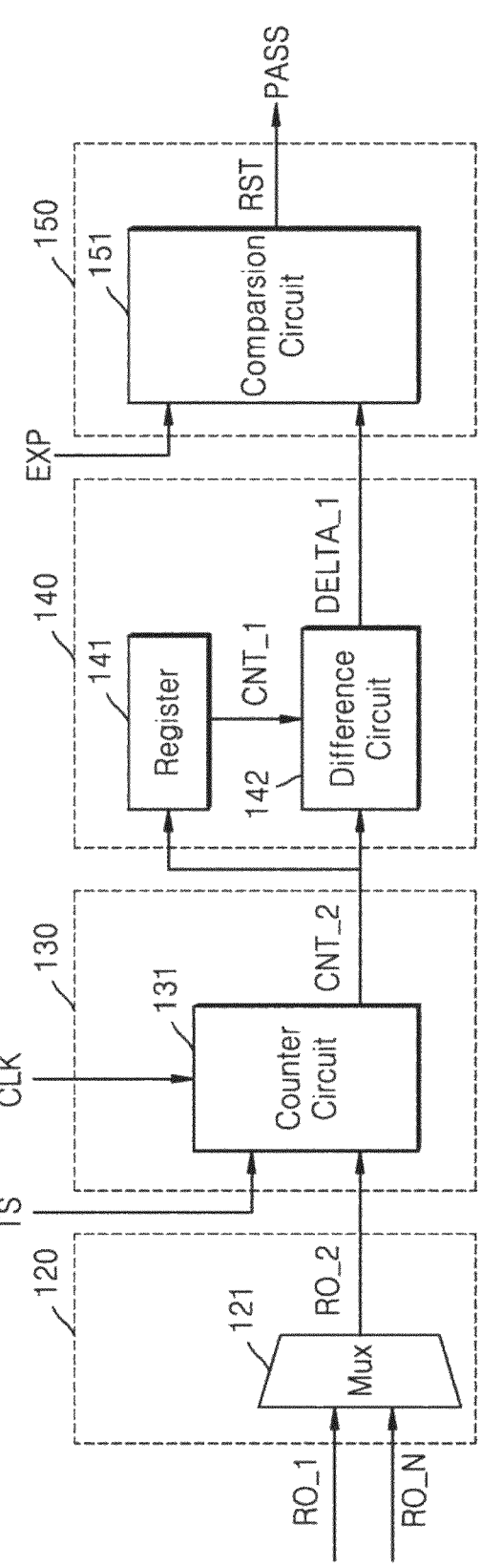

FIGS. 7 and 8 are diagrams illustrating a method of operating the detection circuit 70 of a selected row according to an example embodiment.

FIGS. 5 to 7 are diagrams illustrating a method of operating of the detection circuit 70 when a first row is selected. The counter circuit 131 may receive the first driving signal TS from the timing controller 60, and the multiplexer 121 may receive the plurality of row output signals RO_1 to RO_N to select and output the first row output signal RO_1. The counter circuit 131 may receive the first driving signal TS and the first row output signal RO_1 and output the first count result value CNT_1. The first count result value CNT_1 may be a value obtained by counting cycles of the clock signal CLK in a time interval in which the first row output signal RO_1 is delayed compared to the first driving signal TS.

FIGS. 5, 6, and 8 are diagrams illustrating a method of operating the detection circuit 70 when a second row is selected. The multiplexer 121 may select and output the second row output signal RO_2. The counter circuit 131 may receive the first driving signal TS and the second row output signal RO_2 and output the second count result value CNT_2. The second count result value CNT_2 may be a value obtained by counting cycles of the clock signal CLK in a time interval in which the second row output signal RO_2 is delayed compared to the first driving signal TS. The second count result value CNT_2 may be provided to the register 141 and the difference circuit 142. The register 141 may provide the first count result value CNT_1 to the difference circuit 142. The difference circuit 142 may generate and output the second difference value DELTA_2 by subtracting the first count result value CNT_1 from the second count result value CNT_2. The comparison circuit 151 may compare the second difference value DELTA_2 with the reference value EXP. When the second difference value DELTA_2 is less than the reference value EXP, the comparison circuit 151 may output a result value PASS corresponding to a pass. When the second difference value DELTA_2 is greater than the reference value EXP, the comparison circuit 151 may output a result value corresponding to a fail.

FIG. 9 is a flowchart illustrating a method of operating an image sensor according to an example embodiment.

Referring to FIG. 9, the timing controller 60 may provide the first driving signal TS (S110). For example, referring to FIGS. 1 and 2, the counter circuit 131 may receive the first driving signal TS from the timing controller 60.

The row output signal selection block 120 may receive the plurality of row output signals RO_1 to RO_N (S120). For example, referring to FIGS. 1 and 2, the multiplexer 121 may receive the plurality of row output signals RO_1 to RO_N from the dummy area DA.

The row output signal selection block 120 may select the Mth row output signal RO_M from among the plurality of row output signals RO_1 to RO_N (S130). For example, referring to FIG. 2, the multiplexer 121 may receive the plurality of row output signals RO_1 to RO_N and select the Mth row output signal RO_M which is one of the plurality of row output signals RO_1 to RO_N.

The counter block 130 may generate an Mth count result value CNT_M, which is a time interval in which the Mth row output signal RO_M is delayed compared to the first driving signal TS (S140). For example, referring to FIG. 3, the counter circuit 131 may receive the Mth row output signal RO_M and the first driving signal TS, and generate and output the Mth count result value CNT_M, which is the time interval in which the Mth row output signal RO_M is delayed based on the first driving signal TS.

The difference block 140 may generate an Mth difference value DELTA_M by calculating the Mth count result value CNT_M and an (M−1)th count result value CNT_(M−1) (S150). For example, referring to FIG. 2, the register 141 may provide the (M−1)th count result value CNT_(M−1) to the difference circuit 142, and the difference circuit 142 may generate the Mth difference value DELTA_M by subtracting the (M−1)th count result value CNT_(M−1) from the Mth count result value CNT_M.

The comparison block 150 may compare the Mth difference value DELTA_M with the reference value EXP (S160). For example, referring to FIG. 2, the comparison circuit 151 may receive the reference value EXP from the outside and receive the Mth count result value CNT_M from the difference circuit 142. The comparison circuit 151 may generate and output a result value corresponding to a fail when the Mth difference value DELTA_M is greater than the reference value EXP (S170), and output a result value corresponding to a pass when the Mth difference value DELTA_M is less than the reference value EXP (S180). When the comparison circuit 151 outputs the result value corresponding to the fail, the timing controller 60 may output an error message to notify a user.

Figure 10:
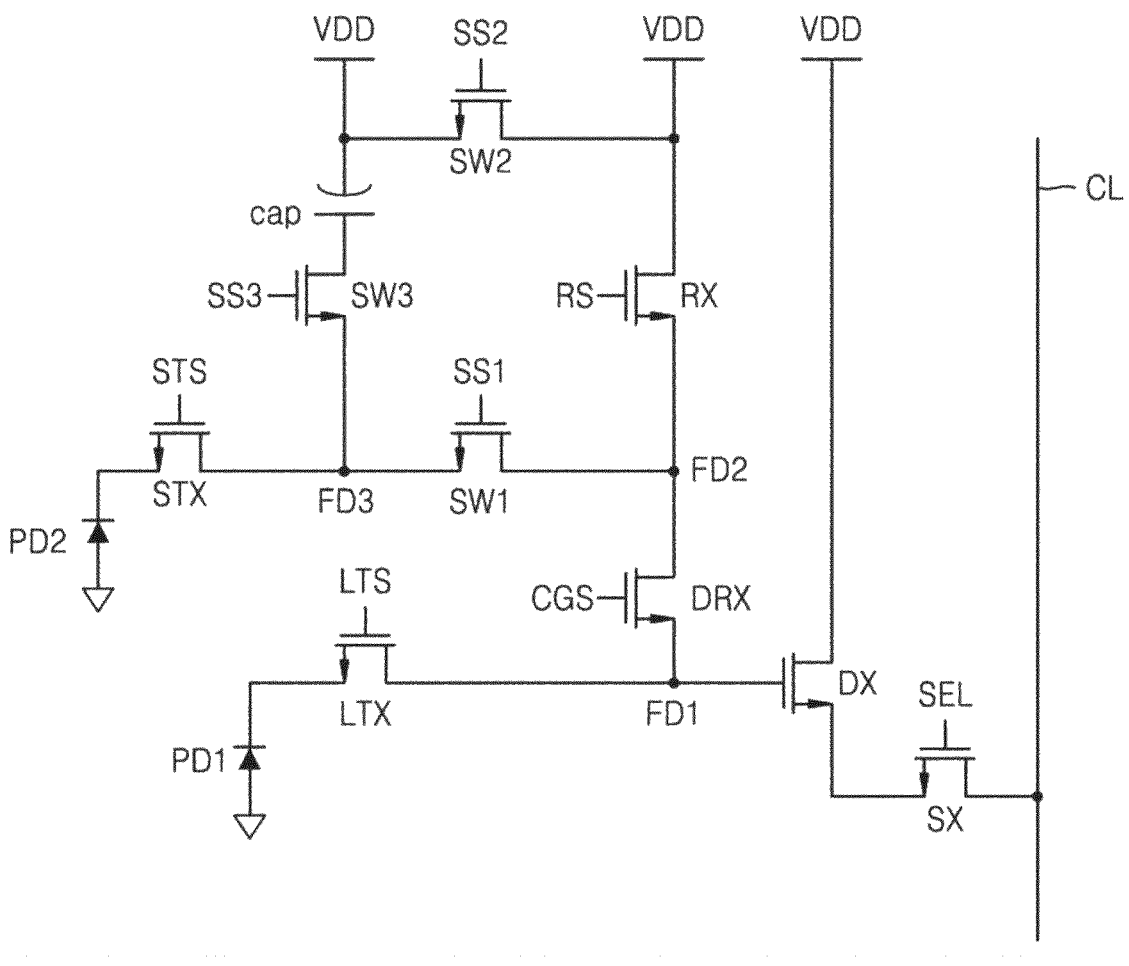
FIG. 10 is a circuit diagram of a pixel included in an image sensor according to an example embodiment.

FIG. 10 is a circuit diagram of a pixel PXa included in an image sensor according to an example embodiment. The pixel PXa shown in FIG. 10 represents an example of one of the pixels PX included in the pixel array 20 of FIG. 1.

Referring to FIG. 10, the pixel PXa may include a plurality of photodiodes and a plurality of transistors, for example, a first photodiode PD1, a second photodiode PD2, a first transfer transistor LTX, a second transfer transistor STX, the reset transistor RX, the selection transistor SX, a first switch SW1, a second switch SW2, a third switch SW3, a conversion gain transistor CGX, and a capacitor cap.

The first photodiode PD1 may be a photodiode with a larger light receiving area, and the second photodiode PD2 may be a photodiode with a smaller light receiving area than the first photodiode PD1. The larger the light receiving area results in an increased exposure to incident light. Accordingly, the first photodiode PD1 with a large light receiving area may be used in a dark environment.

The first photodiode PD1 and the second photodiode PD2 may convert light incident from the outside into an electrical signal. Photodiodes generate charges according to the light intensity. The amount of charges generated by the first photodiode PD1 and the second photodiode PD2 may vary depending on an image capturing environment (low illumination or high illumination), A driving transistor DX may operate as a source follower, and output voltage corresponding to photocharge packets accumulated in a first floating diffusion node FD1 to the column line CL through the selection transistor SX as an output voltage.

The selection transistor SX may select a pixel to output the output voltage. The selection transistor SX may be turned on in response to the selection control signal SEL with an activation level applied to a gate terminal of the selection transistor SX, and output the output voltage (or current) output from the driving transistor DX to the column line CL.

A capacitor, for example, a parasitic capacitor, may be formed in each of floating diffusion nodes FD1, FD2, and FD3. The capacitor cap may be a passive device with fixed or variable capacitance.

One end of the first switch SW1 may be connected to the third floating diffusion node FD3, and the other end thereof may be connected to the second floating diffusion node FD2. The first switch SW1 may be turned on in response to a first switch signal SS1 applied to a gate of the first switch SW1. The first switch signal SS1 may be one of driving signals provided from the timing controller (60 in FIG. 1).

One end of the second switch SW2 may be connected to the capacitor cap, and the other end thereof may be connected to one end of the reset transistor RX. The second switch SW2 may be turned on in response to a second switch signal SS2 applied to a gate of the second switch SW2. The second switch signal SS2 may be one of the driving signals provided from the timing controller (60 in FIG. 1).

One end of the third switch SW3 may be connected to the third floating diffusion node FD3, and the other end thereof may be connected to one end of the capacitor cap. The third switch SW3 may be turned on in response to a third switch signal SS3 applied to a gate of the third switch SW3. The third switch signal SS3 may be one of the driving signals provided from the timing controller (60 in FIG. 1).

The capacitor cap and the driving transistor DX may receive the power supply voltage VDD.

Figure 11:
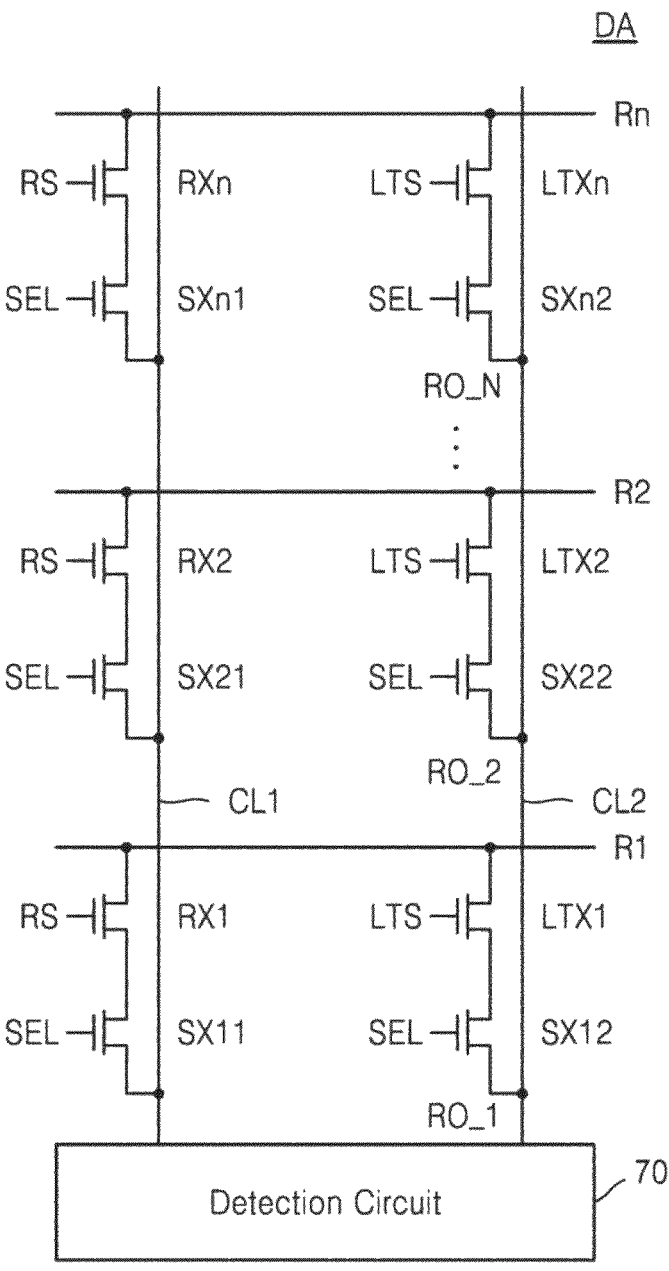
FIG. 11 is a circuit diagram illustrating a dummy area of a pixel array according to an example embodiment.

FIG. 11 is a circuit diagram illustrating the dummy area DA of a pixel array according to an example embodiment. The dummy area DA shown in FIG. 11 may correspond to the dummy area DA shown in FIG. 1.

Referring to FIGS. 10 and 11, the dummy area DA may receive a first driving signal LTS. For example, the first driving signal LTS may be a transfer control signal LTST of the pixel PX. In addition, the dummy area DA may receive the second driving signal RS and the third driving signal SEL. For example, the second driving signal RS may be the reset control signal RS of the pixel PX, and the third driving signal SEL may be the selection control signal SEL.

Referring to FIG. 11, the dummy area DA may output the first row output signal RO_1, the second row output signal RO_2, and the Nth row output signal RO_N based on the first driving signal LTS. In an example embodiment, a configuration and a method in which the dummy area DA counts cycles of the clock signal CLK in a time interval in which the first row output signal RO_1, the second row output signal RO_2, and the Nth row output signal RO_N are delayed based on the first driving signal LTS are illustrated. The first driving signal (LTS) is different from the non-driving driving signal (TS) shown in FIG. 4.

The dummy area DA shown in FIG. 11 may include two or more N type transistors connected in series, but example embodiments are not limited thereto.

The first row R1 of the dummy area DA may include the first reset transistor RX1 to which the second driving signal RS is applied and the first selection transistor SX11 to which the third driving signal SEL is applied, and may include a first transfer transistor LTX1 to which the first driving signal LTS is applied and the second selection transistor SX12 to which the third driving signal SEL is applied. The first row R1 of the dummy area DA may output the first row output signal RO_1 based on the first driving signal LTS.

The second row R2 of the dummy area DA may include the first reset transistor RX2 to which the second driving signal RS is applied and the first selection transistor SX21 to which the third driving signal SEL is applied, and may include a first transfer transistor LTX2 to which the first driving signal LTS is applied and the second selection transistor SX22 to which the third driving signal SEL is applied. The second row R2 of the dummy area DA may output the second row output signal RO_2 based on the first driving signal LTS.

The Nth row Rn of the dummy area DA may include the first reset transistor RXn to which the second driving signal RS is applied and the first selection transistor SXn1 to which the third driving signal SEL is applied, and may include a first transfer transistor LTXn to which the first driving signal LTS is applied and the second selection transistor SXn2 to which the third driving signal SEL is applied. The Nth row Rn of the dummy area DA may output the Nth row output signal RO_N based on the first driving signal LTS.

The dummy area DA may be connected to the detection circuit 70 through the column line CL, which may include first column line CL1 and second column line CL2. The dummy area DA may output the first row output signal RO_1, the second row output signal RO_2, and the Nth row output signal RO_N to the second column line CL2 and provide the first row output signal RO_1, the second row output signal RO_2, and the Nth row output signal RO_N to the detection circuit 70, based on the first driving signal LTS. The detection circuit 70 may receive the first row output signal RO_1, the second row output signal RO_2, and the Nth row output signal RO_N through the same second column line CL2.

Figure 12:
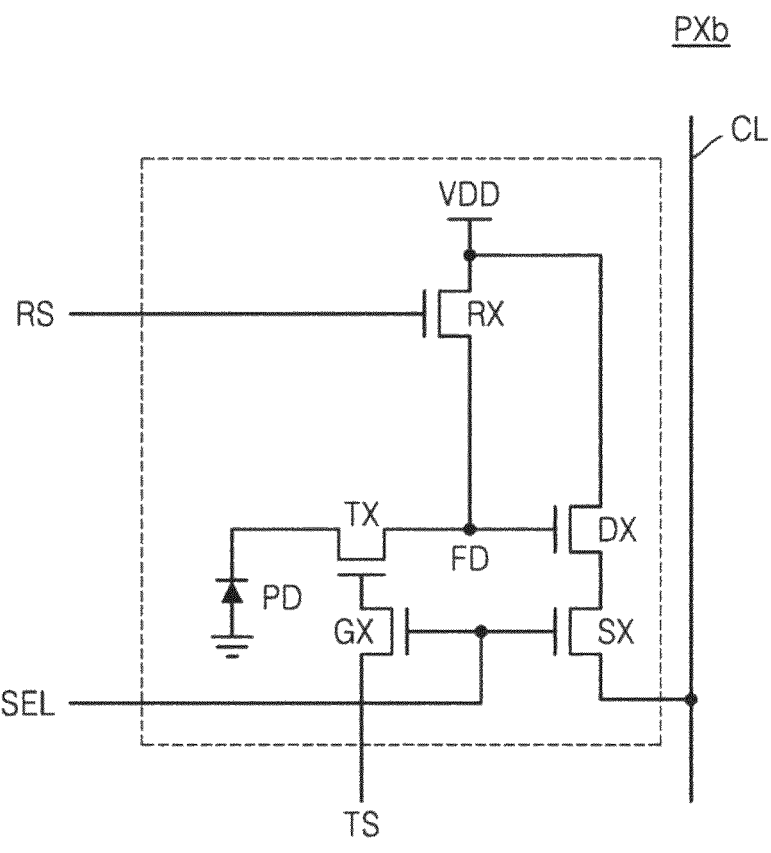
FIGS. 12 and 13 are circuit diagrams of pixels included in an image sensor according to an example embodiment.
Figure 13:
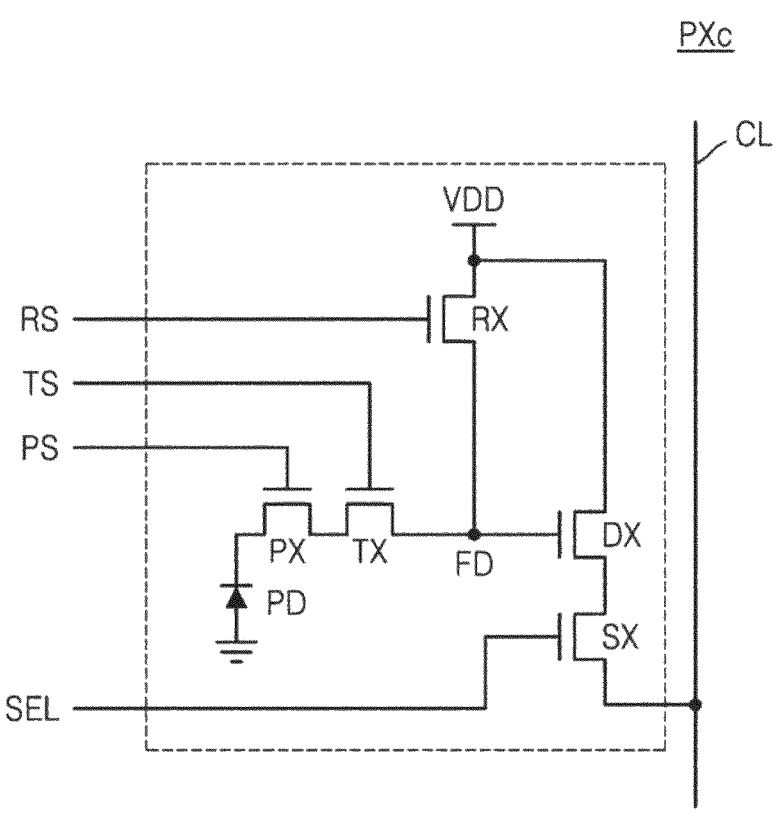

FIGS. 12 and 13 are circuit diagrams of pixels PXb and PXc included in an image sensor according to an example embodiment. The pixels PXb and PXc of FIGS. 12 and 13 represent an example of one of the pixels PX included in the pixel array 20 of FIG. 1.

Referring to FIG. 12, the pixel PXb may include the photodiode PD as a light sensing device, and include the transfer transistor TX, a gate transistor GX, the reset transistor RX, the driving transistor DX, and the selection transistor SX as read circuits. That is, the pixel PXb may have a 5-transistor structure. The gate transistor GX may selectively apply the transfer control signal TS to the transfer transistor TX in response to the selection signal SEL. At this time, three driving signals including the transfer control signal TS, the second driving signal RS, and the selection signal SEL may be applied to the pixel PXb.

Referring to FIG. 13, the pixel PXc may include the photodiode PD as a light sensing element, and include a photo transistor PX (or a photo gate), the transfer transistor TX, the reset transistor RX, the driving transistor DX, and the selection transistor SX as read circuits. That is, the pixel PXc may have a 5-transistor structure. In addition, the pixel PXc may have a 6-transistor structure that further includes the gate transistor GX or a bias transistor.

The photo transistor PX may be turned on/off in response to a photo gate signal PS applied to a gate of the photo transistor PX. When the photo transistor PX is in the on state, the photodiode PD may detect incident light to generate photo charges. On the other hand, when the photo transistor PX is in the off state, the photodiode PD may not detect incident light. At this time, four driving signals including the transfer control signal TS, the second driving signal RS, the photo gate signal PS, and the selection signal SEL may be applied to the pixel PXc.

Figure 14:
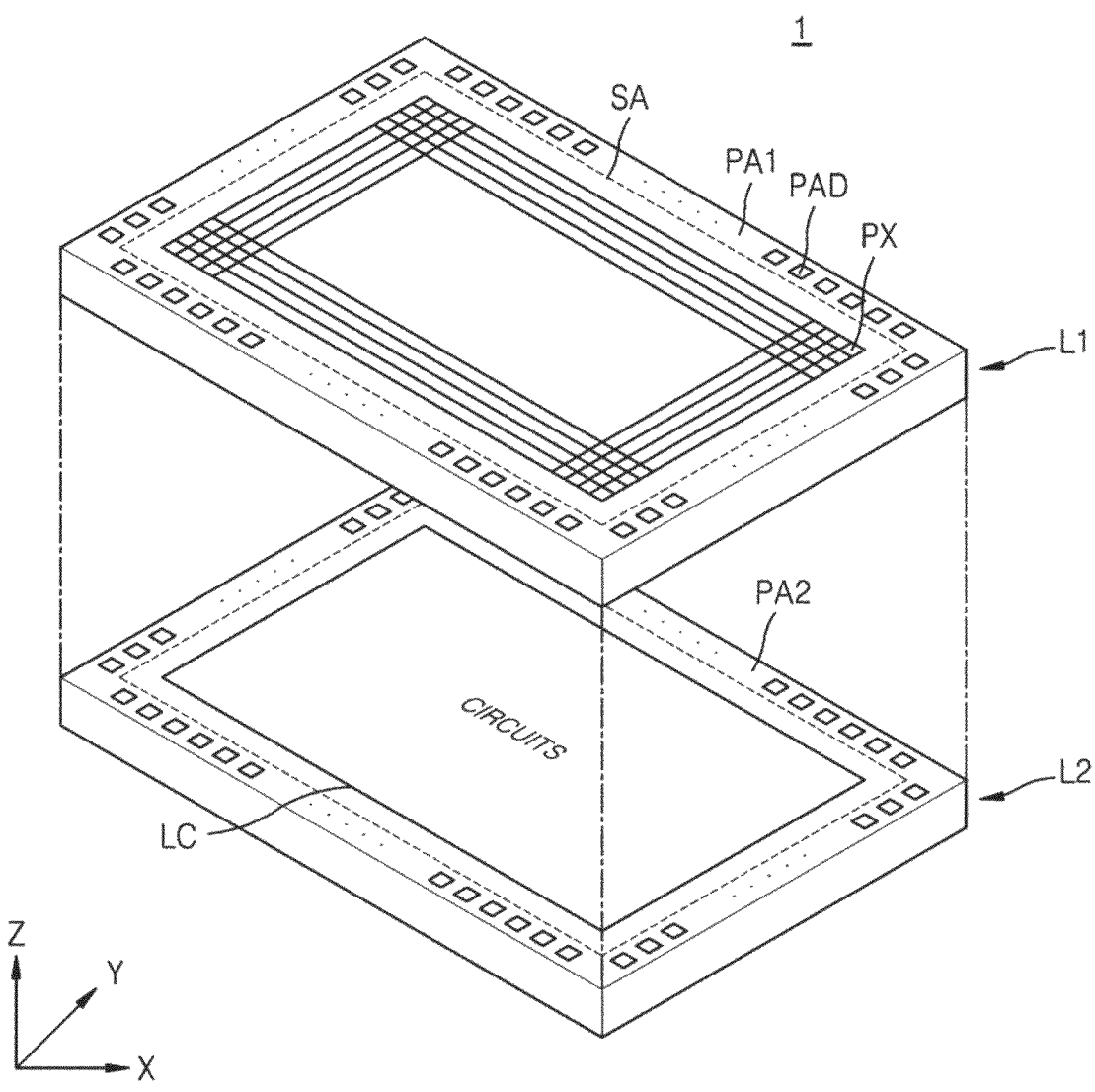
FIG. 14 is a diagram illustrating a stack structure of an image sensor according to an example embodiment.

FIG. 14 is a diagram illustrating a stack structure of an image sensor 1 according to an example embodiment.

Referring to FIG. 14, the image sensor 1 may include a first semiconductor layer L1 and a second semiconductor layer L2. The first semiconductor layer L1 may be stacked in a vertical direction (e.g., Z) with respect to the second semiconductor layer L2. Specifically, the second semiconductor layer L2 may be disposed below the first semiconductor layer L1 in the vertical direction (Z). A first direction (X) and a second direction (Y) may be perpendicular to each other and parallel to a surface of a semiconductor layer.

The first direction (X) may be formed such that positions of pads of a lower surface of the first semiconductor layer L1 match positions of pads of an upper surface of the second semiconductor layer L2, and the first semiconductor layer L1 may be electrically connected to the second semiconductor layer L2 by bonding the pads.

Referring to FIGS. 1 and 14 together, in an example embodiment, the pixel array 20 may be formed in the first semiconductor layer L1. For example, the pixel area PA and the dummy area DA of the pixel array 20 including the plurality of pixels PX may be formed in the first semiconductor layer L1. In addition, the first semiconductor layer L1 may include a sensing area SA in which the plurality of pixels PX are provided, a circuit area LC in which devices for driving the plurality of pixels PX are provided, and pad areas PA1 and PA2 respectively surrounding peripheries of the sensing area SA and the circuit area LC. A plurality of upper pads PAD are disposed on the pad area PA, and may be connected to the devices provided in the second semiconductor layer L2 through vias, etc.

The second semiconductor layer L2 may include the circuit area LC, and peripheral circuits of the pixel array (20 in FIG. 1), for example, the row driver 30, the ADC circuit 40, and the column driver 50, the timing controller 60, and the detection circuit 70, may be formed in the circuit area LC. For example, the second semiconductor layer L2 may include a memory area and a dummy area. Memory devices such as dynamic random access memory (DRAM) devices or static random access memory (SRAM) devices may be disposed in the memory area. However, the memory devices disposed in the memory area are not limited to the DRAM devices or the SRAM devices. The dummy area may serve to support the first semiconductor layer L1 rather than store data.

In an example embodiment, the dummy area of the pixel array 20 may be formed in the first semiconductor layer L1, and the detection circuit 70 may be formed in the second semiconductor layer L2, thereby minimizing the size of the image sensor 1 due to a contact portion connecting between the first semiconductor layer L1 and the second semiconductor layer L2.

Figure 15:
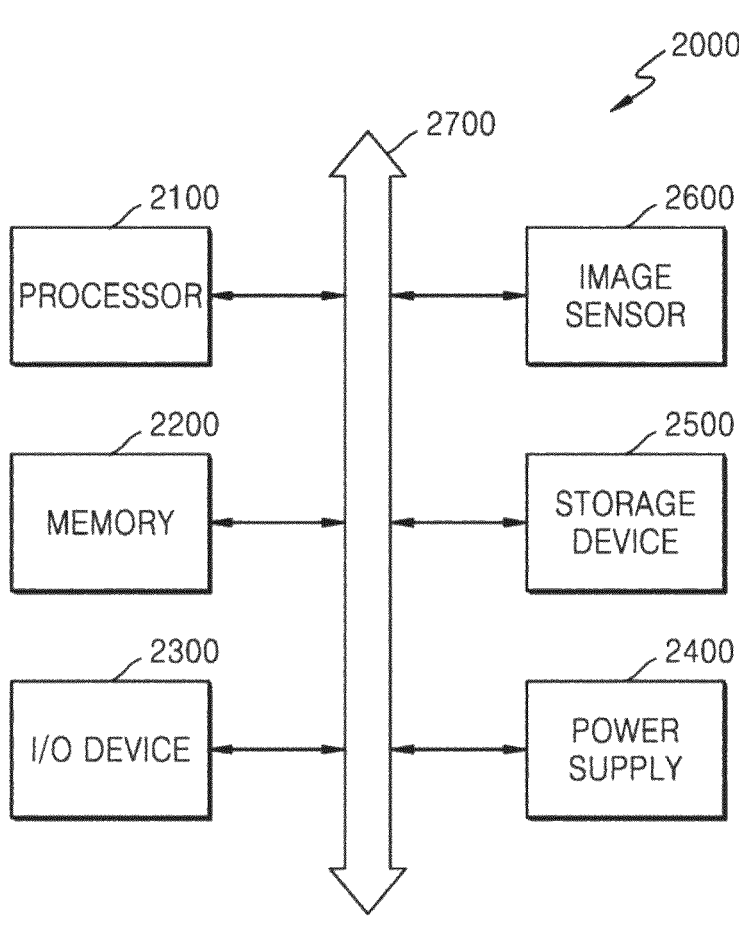
FIG. 15 is a block diagram schematically illustrating a computer system including an image sensor according to an example embodiment.

FIG. 15 is a block diagram schematically illustrating a computer system 2000 including an image sensor 2600 according to an example embodiment.

Referring to FIG. 15, the computer system 2000 may include a processor 2100, a memory 2200, an input/output (I/O) device 2300, a power supply 2400, a storage device 2500, the image sensor 2600, and a system bus 2700. The processor 2100, the memory 2200, the I/O device 2300, the power supply 2400, the storage device 2500, and the image sensor 2600 may communicate with each other via the system bus 2700.

The processor 2100 may be implemented as a microprocessor, a central processing unit (CPU), any other type of control circuit (application-specific integrated circuit (ASIC)), an application processor (AP), etc.

The memory 2200 may be implemented as volatile memory and/or non-volatile memory.

The I/O device 2300 may include an input interface, such as a keyboard, a keypad, a mouse, etc., and an output interface, such as a printer or a display.

The power supply 2400 may supply operating voltage required for an operation of the computer system 2000.

The storage device 2500 may include a solid state drive (SSD), a hard disk drive (HDD), a CD-ROM, etc.

The image sensor 2600 may be the same as the image sensor 10 shown in FIG. 1. The image sensor 2600 may count cycles of the clock signal CLK in a time interval in which a selected Mth row output signal is delayed compared to a driving signal, generate a difference value between a previous count result value and the count result value, compare the difference value with a reference value, determine and detect whether a selected row is faulty.

Figure 16:
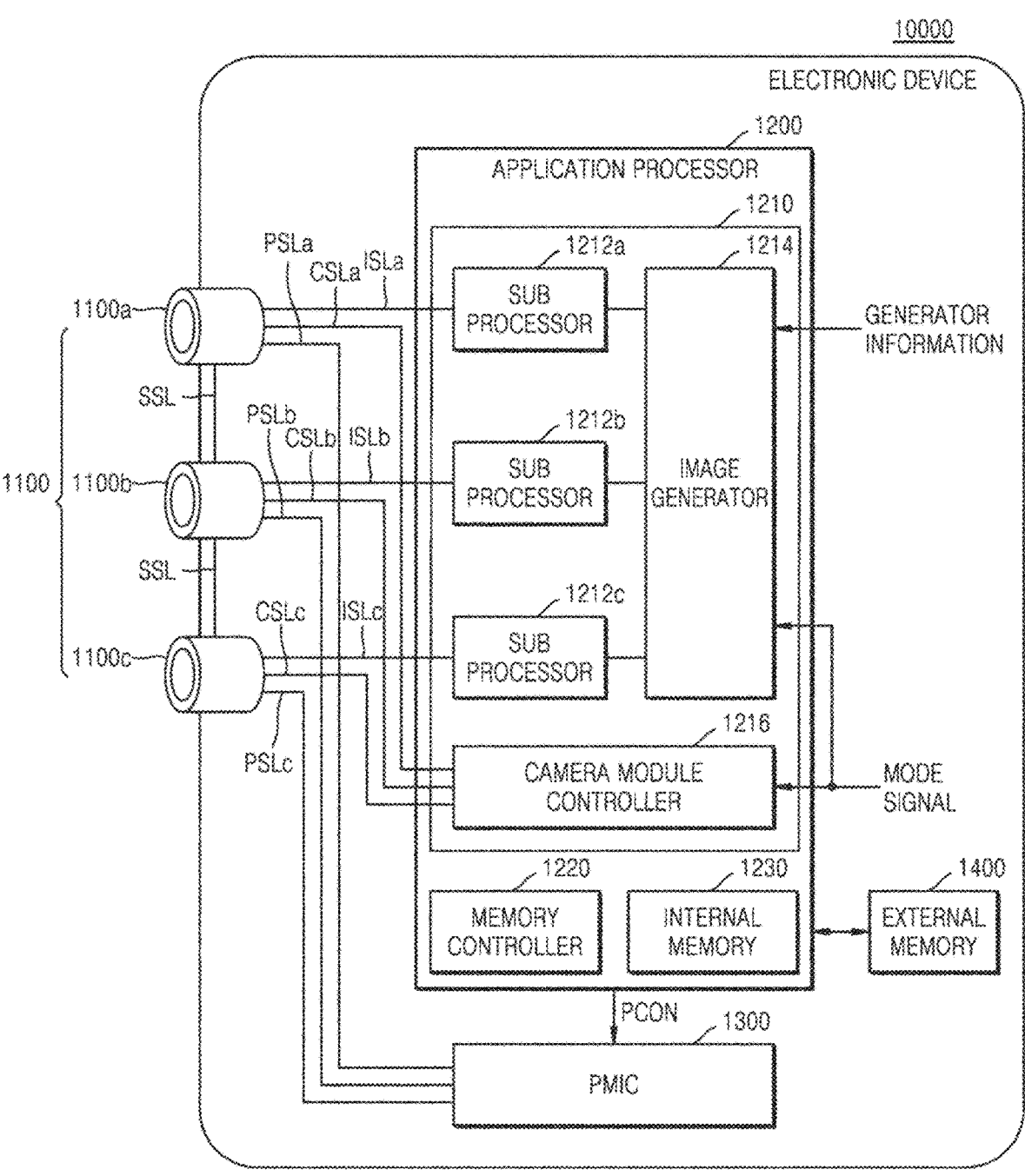
FIG. 16 is a block diagram of an electronic device including a multi-camera module according to an example embodiment.
Figure 17:
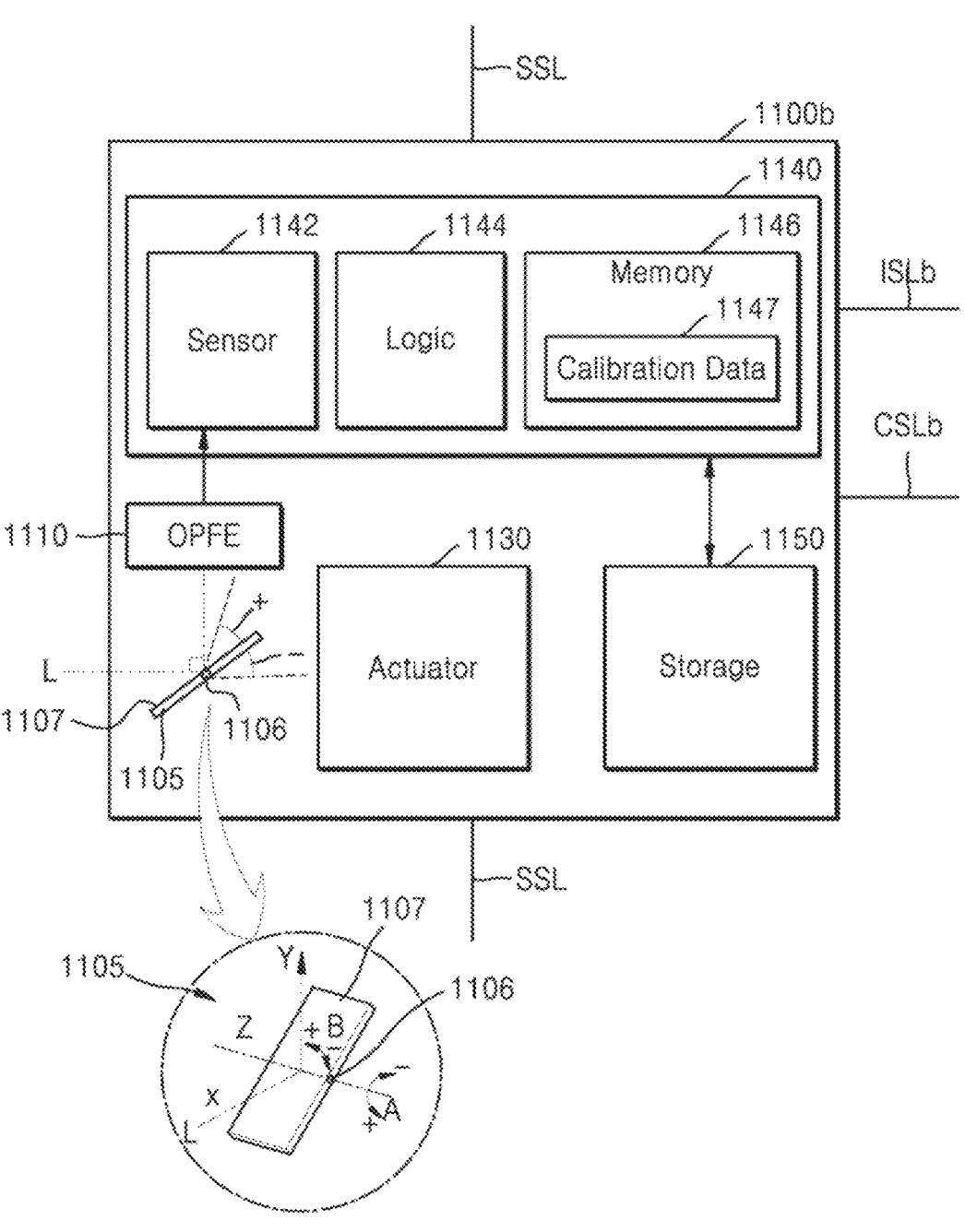
FIG. 17 is a detailed block diagram of a multi-camera module according to an example embodiment.

FIG. 16 is a block diagram of an electronic device including a multi-camera module. FIG. 17 is a detailed block diagram of the multi-camera module in the electronic device of FIG. 16.

Referring to FIG. 16, an electronic device 1000 may include a camera module group 1100, an application processor 1200, a power management integrated circuit (PMIC) 1300, and external memory 1400.

The camera module group 1100 may include a plurality of camera modules 1100a, 1100b, and 1100c. Although the drawings show an example in which three camera modules 1100a, 1100b, and 1100c are disposed, example embodiments are not limited thereto. In some example embodiments, the camera module group 1100 may be modified to include only two camera modules. Also, in some example embodiments, the camera module group 1100 may be modified to include k (k is 4 or greater natural number) camera modules.

Hereinafter, a detailed configuration of the camera module 1100b is described in detail below with reference to FIG. 17, but the description provided below may be also applied to the other camera modules 1100a and 1100c.

Referring to FIG. 17, the camera module 1100b may include a prism 1105, an optical path folding element (OPFE) 1110, an actuator 1130, an image sensing device 1140, and a storage 1150.

The prism 1105 may include a reflecting surface 1107 of a light-reflecting material and may deform a path of light L incident from outside.

In some example embodiments, the prism 1105 may change the path of the light L incident in 1 first direction (X-direction) into a second direction (Y-direction) that is perpendicular to the first direction (X-direction). Also, the prism 1105 may rotate the reflecting surface 1107 having the light-reflecting material about a center axis 1106 in a direction A, or about the center axis 1106 in a direction B so that the path of the light L incident in the first direction (X-direction) may be changed to the second direction (Y-direction) perpendicular to the first direction (X-direction). Here, the OPFE 1110 may also move in the third direction (Z-direction) that is perpendicular to the first direction (X-direction) and the second direction (Y-direction).

In some example embodiments, as shown in the drawings, the maximum rotation angle of the prism 1105 in the direction A is 15° or less in a positive A direction and is greater than 15° in a negative A direction, but example embodiments are not limited thereto.

In some example embodiments, the prism 1105 may be moved by the angle of about 20°, or between 10° to 20° or 15° to 20° in the positive or negative B direction. Here, the moving angle is the same in the positive or negative B direction, or may be similar within a range of about 1°.

In some example embodiments, the prism 1105 may move the reflecting surface 1307 of the light-reflective material in the third direction (e.g., Z direction) that is parallel to a direction in which the center axis 1106 extends.

The OPFE 1110 may include, for example, optical lenses formed as m groups (here, m is a natural number). Here, the m lenses may move in the second direction (Y-direction) and thus may change an optical zoom ratio of the camera module 1100b. For example, when a basic optical zoom ratio of the camera module 1100b is Z and m optical lenses included in the OPFE 1110 move, the optical zoom ratio of the camera module 1100b may be changed to 3 Z, 5 Z, or 10 Z or greater.

The actuator 1130 may move the OPFE 1110 or the optical lens (hereinafter, referred to as optical lens) to a specific position. For example, the actuator 1130 may adjust the position of the optical lens so that the image sensor 1142 may be located at a focal length of the optical lens for an exact sensing operation.

An image sensing device 1140 may include the image sensor 1142, a control logic 1144, and a memory 1146. The image sensor 1142 may sense an image of a sensing target by using the light L provided through the optical lens. A pixel and a pixel array described with reference to FIGS. 2 to 16 may be applied to the image sensor 1142. The pixel may include a plurality of sub pixels (e.g., four sub pixels), each including a plurality of photoelectric conversion devices and a plurality of floating diffusion areas, and the plurality of floating diffusion areas of the plurality of sub pixels may be electrically connected to each other through wirings. Sensitivities of the plurality of sub pixels may be improved. Accordingly, the resolution and image quality of the image sensor 1142 may be improved.

The control logic 1144 may control the overall operations of the camera module 1100b. For example, the control logic 1144 may control the operations of the camera module 1100b according to a control signal provided through a control signal line CSLb.

The memory 1146 may store information that is necessary for the operation of the camera module 1100b, e.g., calibration data 1147. The calibration data 1147 may include information that is necessary for the camera module 1100b to generate image data by using the light L provided from outside. The calibration data 1147 may include, for example, information about a degree of rotation, information about a focal length, information about an optical axis, etc. described above. When the camera module 1100b is implemented in the form of a multi-state camera of which the focal length is changed according to the position of the optical lens, the calibration data 1147 may include information related to focal length values of the optical lens according to positions (or states) and auto-focusing.

The storage 1150 may store the image data sensed through the image sensor 1142. The storage 1150 may be disposed outside the image sensing device 1140 or may be implemented in a stacked form with a sensor chip constituting the image sensing device 1140.

In some example embodiments, the storage 1150 may be implemented as electrically erasable programmable read-only memory (EEPROM), but example embodiments are not limited thereto. In some example embodiments, the image sensor 1142 is configured as a pixel array, and the control logic 1144 may include an analog to digital converter and an image signal processor processing a sensed image.

Referring to FIGS. 16 and 17 together, in some example embodiments, each of the plurality of camera modules 1100a, 1100b, and 1100c may include the actuator 1130. Accordingly, each of the plurality of camera modules 1100a, 1100b, and 1100c may include the calibration data 1147 that is the same as or different from the others, according to the operation of the actuator 1130 included therein.

In some example embodiments, one (e.g., 1100*b*) of the plurality of camera modules 1100*a*, 1100*b*, and 1100*c* may be a folded lens type camera module including the prism 1105 and the OPFE 1110 described above, and the other camera modules (e.g., 1100*a* and 1100*c*) may be vertical type camera modules not including the prism 1105 and the OPFE 1110, but example embodiments are not limited thereto.

One (e.g., 1100*c*) of the plurality of camera modules 1100*a*, 1100*b*, and 1100*c* may be the camera module 30 shown in FIG. 1.

The image sensor may include a detection circuit, and the detection circuit may generate a count result value by counting cycles of the clock signal CLK in time intervals in which a selected Mth row output signal is delayed compared to a driving signal, generate a difference value between a previous count result value and the count result value, compare the difference value with a reference value, determine and detect whether a selected Mth row is defective.

In some example embodiments, at least two camera modules (e.g., 1100*a* and 1100*b*) among the plurality of camera module 1100*a*, 1100*b*, and 1100*c* may have different field of views (different viewing angles). In this case, for example, the optical lenses of the at least two camera modules (e.g., 1100*a* and 1100*b*) among the plurality of camera modules 1100*a*, 1100*b*, and 1100*c* may be different from each other, but example embodiments are not limited thereto.

Also, in some example embodiments, the plurality of camera modules 1100*a*, 1100*b*, and 1100*c* may have different field of views from one another. For example, the camera module 1100*a* may be an ultrawide camera, the camera module 1100*b* may be a wide camera, and the camera module 1100*c* may be a tele camera, but example embodiments are not limited thereto. In this case, the optical lenses respectively included in the plurality of camera modules 1100*a*, 1100*b*, and 1100*c* may be different from one another, but example embodiments are not limited thereto.

In some example embodiments, each of the plurality of camera modules 1100*a*, 1100*b*, and 1100*c* may be arranged to be physically separated from one another. That is, the plurality of camera modules 1100*a*, 1100*b*, and 1100*c* do not divide and use a sensing area of one image sensor 1142, and the independent image sensor 1142 may be disposed inside each of the plurality of camera modules 1100*a*, 1100*b*, and 1100*c*.

Referring back to FIG. 16, the application processor 1200 may include an image processing device 1210, a memory controller 1220, and an internal memory 1230. The application processor 1200 may be separately implemented from the plurality of camera modules 1100*a*, 1100*b*, and 1100*c*. For example, the application processor 1200 and the plurality of camera modules 1100*a*, 1100*b*, and 1100*c* may be separately implemented as separate semiconductor chips.

The image processing device 1210 may include a plurality of sub image processors 1212*a*, 1212*b*, 1212*c*, an image generator 1214, and a camera module controller 1216.

The image processing device 1210 may include the plurality of sub image processors 1212*a*, 1212*b*, and 1212*c* respectively corresponding to the number of camera modules 1100*a*, 1100*b*, and 1100*c*.

Image data generated from the camera modules 1100*a*, 1100*b*, and 1100*c* may be respectively provided to the corresponding sub image processors 1212*a*, 1212*b*, and 1212*c* through separate image signal lines ISLa, ISLb, and ISLc. For example, the image data generated from the camera module 1100*a* may be provided to the sub image processor 1212*a* through the image signal line ISLa, the image data generated from the camera module 1100*b* may be provided to the sub image processor 1212*b* through the image signal line ISLb, the image data generated from the camera module 1100*c* may be provided to the sub image processor 1212*c* through the image signal line ISLc. Such image data transfer may be performed by using, for example, a camera serial interface (CSI) based on a mobile industry processor interface (MIPI), but example embodiments are not limited thereto.

In some example embodiments, one sub image processor may be disposed to correspond to a plurality of camera modules. For example, the sub image processor 1212*a* and the sub image processor 1212*c* are not implemented separately from each other as shown, but may be integrated into one sub image processor, and the image data provided from the camera module 1100*a* and the camera module 1100*c* may be selected through a selection device (e.g., a multiplexer) and then provided to the integrated sub image processor. At this time, the sub image processor 1212*b* may not be integrated and may receive the image data from the camera module 1100*b*.

In addition, in some example embodiments, the image data generated from the camera module 1100*a* may be provided to the sub image processor 1212*a* through the image signal line ISLa, the image data generated from the camera module 1100*b* may be provided to the sub image processor 1212*b* through the image signal line ISLb, and the image data generated from the camera module 1100*c* may be provided to the sub image processor 1212*c* through the image signal line ISLc. In addition, the image data processed by the sub image processor 1212*b* may be directly provided to the image generator 1214, but one of the image data processed by the sub image processor 1212*a* and the image data processed by the sub image processor 1212*c* may be selected through a selection device (e.g., a multiplexer), etc., and then provided to the image generator 1214.

The sub image processors 1212*a*, 1212*b*, and 1212*c* may respectively perform image processing, such as bad pixel correction and 3 A adjustment (auto-focus correction, auto-white balance, and auto-exposure), noise reduction, sharpening, gamma control, remosaic, etc., on the image data provided from the camera modules 1100*a*, 1100*b*, and 1100*c*.

In some example embodiments, remosaic signal processing may be performed by each of the camera modules 1100*a*, 1100*b*, and 1100*c* and then provided to the sub image processors 1212*a*, 1212*b*, and 1212*c*.

The image data processed by each of the sub image processors 1212*a*, 1212*b*, and 1212*c* may be provided to the image generator 1214. The image generator 1214 may generate an output image by using the image data provided from each of the sub image processors 1212*a*, 1212*b*, and 1212*c* according to image generating information or a mode signal.

Specifically, the image generator 1214 may generate the output image by merging at least some of the image data generated from the camera modules 1100*a*, 1100*b*, and 1100*c* having different field of views, according to the image generating information or the mode signal. Also, the image generator 1214 may generate the output image by selecting one of the image data generated from the camera modules 1100*a*, 1100*b*, and 1100*c* having different field of views, according to the image generating information or the mode signal.

In some example embodiments, the image generating information may include a zoom signal or a zoom factor. Also, in some example embodiments, the mode signal may be, for example, a signal based on a mode selected by a user.

When the image generating information is a zoom signal (zoom factor) and the camera modules 1100a, 1100b, and 1100c have different field of views (angle of views) from one another, the image generator 1214 may perform different operations according to the type of zoom signal. For example, when the zoom signal is a first signal, the image generator 1214 may generate the output image by using the image data output from the sub image processor 1212a and the image data output from the sub image processor 1212b, among the image data output from the sub image processor 1212a and the image data output from the sub image processor 1212c. When the zoom signal is a second signal different from the first signal, the image generator 1214 may generate the output image by using the image data output from the sub image processor 1212c and the image data output from the sub image processor 1212b, among the image data output from the sub image processor 1212a and the image data output from the sub image processor 1212c. When the zoom signal is a third signal different from the first signal and the second signal, the image generator 1214 may not merge the image data but may generate the output image by selecting one of the image data output from the sub image processors 1212a, 1212b, and 1212c. However, example embodiments are not limited thereto, and the method of processing the image data may be modified as necessary.

In some example embodiments, the image processing device 1210 may further include a selector that selects outputs of the sub image processors 1212a, 1212b, and 1212c and transfers the selected output to the image generator 1214.

In this case, the selector may perform different operations according to the zoom signal or the zoom factor. For example, when the zoom signal is a fourth signal (e.g., a zoom magnification is a first magnification), the selector may select one of the outputs of the sub image processors 1212a, 1212b, and 1212c and transfers the selected output to the image generator 1214.

In addition, when the zoom signal is a fifth signal different from the fourth signal (e.g., the zoom magnification is a second magnification), the selector may sequentially transfer p outputs (p is a natural number of 2 or more) among the outputs of the sub image processors 1212a, 1212b, and 1212c to the image generator 1214. For example, the selector may sequentially transfer the outputs of the sub image processor 1212b and the sub image processor 1212c to the image generator 1214. In addition, the selector may sequentially transfer the outputs of the sub image processor 1212a and the sub image processor 1212b to the image generator 1214. The image generator 1214 may generate one output image by merging the p sequentially provided outputs.

Here, image processing such as demosaic, down scaling to a video/preview resolution size, gamma correction, high dynamic range (HDR) processing, etc. may be previously performed by the sub image processors 1212a, 1212b, and 1212c, and then, the processed image data is transferred to the image generator 1214. Accordingly, even though the processed image data is provided to the image generator 1214 through one signal line through a selector, an image merging operation of the image generator 1214 may be performed at high speed.

In some example embodiments, the image generator 1214 may receive a plurality of image data with different exposure times from at least one of the plurality of sub image processors 1212a, 1212b, and 1212c, and perform HDR processing on the plurality of image data, thereby generating the merged image data with an increased dynamic range.

The camera module controller 1216 may provide a control signal to each of the camera modules 1100a, 1100b, and 1100c. The control signals generated by the camera module controller 1216 may be provided to the corresponding camera modules 1100a, 1100b, and 1100c through the control signal lines CSLa, CSLb, and CSLc separated from one another.

One of the plurality of camera modules 1100a, 1100b, and 1100c may be designated as a master camera (e.g., 1100b) according to the image generating information including the zoom signal or the mode signal, and the remaining camera modules (e.g., 1100a and 1100c) may be designated as slave cameras. This information may be included in the control signal and provided to the corresponding camera modules 1100a, 1100b, and 1100c through the separate control signal lines CSLa, CSLb, and CSLc.

Camera modules operating as a master and a slave may be changed according to the zoom factor or an operation mode signal. For example, when an angle of view of the camera module 1100a is wider than that of the camera module 1100b, and the zoom factor indicates a low zoom ratio, the camera module 1100b may operate as a master and the camera module 1100a may operate as a slave. Conversely, when the zoom factor indicates a high zoom magnification, the camera module 1100a may operate as the master and the camera module 1100b may operate as the slave.

In some example embodiments, the control signal provided from the camera module controller 1216 to each of the camera modules 1100a, 1100b, and 1100c may include a sync enable signal. For example, when the camera module 1100b is the master camera and the camera modules 1100a and 1100c are the slave cameras, the camera module controller 1216 may transmit a sync enable signal to the camera module 1100b. The camera module 1100b that receives the sync enable signal may generate a sync signal based on the sync enable signal, and provide the generated sync signal to the camera modules 1100b and 1100c through a sync signal line SSL. The camera module 1100b and the camera modules 1100a and 1100c may be synchronized to the sync signal and transmit the image data to the application processor 1200.

In some example embodiments, the control signals provided to the plurality of camera modules 1100a, 1100b, and 1100c from the camera module controller 1216 may include the mode information according to the mode signal. The plurality of camera modules 1100a, 1100b, and 1100c may operate in a first operation mode and a second operation mode in relation to the sensing speed, based on the mode information.

In the first operation mode, the plurality of camera modules 1100a, 1100b, and 1100c may generate an image signal at a first speed (e.g., generate an image signal of a first frame rate), encode the image signal at a second speed that is faster than the first speed (e.g., encode an image signal of a second frame rate that is greater than the first frame rate), and transmit the encoded image signal to the application processor 1200. Here, the second speed may be 30 times or less than the first speed.

The application processor 1200 may store the received image signal, that is, the encoded mage signal, in the memory 1230 provided inside or the storage 1400 outside the application processor 1200, then, read and decode the encoded signal from the memory 1230 or the storage 1400, and may display image data generated based on the decoded image signal. For example, the corresponding sub processor among the plurality of sub processors 1212a, 1212b, and 1212c of the image processing device 1210 may perform decoding, and also may perform image processing on the decoded image signal.

In the second operation mode, the plurality of camera modules 1100a, 1100b, and 1100c may generate an image signal at a third speed that is slower than the first speed (e.g., generate the image signal of a third frame rate that is lower than the first frame rate), and transmit the image signal to the application processor 1200. The image signal provided to the application processor 1200 may be a signal that is not encoded. The application processor 1200 may perform image processing on the received image signal or store the image signal in the memory 1230 or the storage 1400.

The PMIC 1300 may supply power, for example, a source voltage, to each of the plurality of camera modules 1100a, 1100b, and 1100c. For example, the PMIC 1300 may supply first power to the camera module 1100a through a power signal line PSLa, second power to the camera module 1100b through a power signal line PSLb, and third power to the camera module 1100c through a power signal line PSLc, under control of the application processor 1200.

The PMIC 1300 may generate power corresponding to each of the plurality of camera modules 1100a, 1100b, and 1100c and also may adjust a level of power, in response to a power control signal PCON from the application processor 1200. The power control signal PCON may include a power adjusting signal for each operation mode of the plurality of camera modules 1100a, 1100b, and 1100c. For example, an operation mode may include a low power mode, and at this time, the power control signal PCON may include information about a camera module operating in the low power mode and a set power level. Levels of power provided to the plurality of camera modules 1100a, 1100b, and 1100c may be the same as or different from one another. In addition, the levels of power may be dynamically changed.

In some embodiments, each of the components represented by a block as illustrated in FIGS. 1, 2, 7, 8 and 15-17 may be implemented as various numbers of hardware and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. An image sensor comprising:
a pixel array comprising a pixel area and a dummy area adjacent to and on a same plane as the pixel area, the pixel area comprising pixels provided in a plurality of rows;
a row driver configured to sequentially output driving signals to the pixel array;
a detection circuit configured to receive a plurality of row output signals generated based on the driving signals from the dummy area, and receive the driving signals; and
a timing controller configured to provide the driving signals to the row driver, and the driving signals and a clock signal to the detection circuit,
wherein the detection circuit is further configured to identify difference values between delay times corresponding to adjacent rows of the plurality of rows, determine whether the plurality of rows are defective by comparing the difference values with a reference value, and output result values indicating whether the plurality of rows are defective.

2. The image sensor of claim 1, wherein a second output signal, from among the plurality of row output signals, first toggles from a logic low level to a logic high level in a delay time.

3. The image sensor of claim 1, wherein the dummy area is disposed on a first side of the pixel area, and
wherein the row driver is disposed on a second side of the pixel area opposite to the first side.

4. The image sensor of claim 1, wherein the plurality of rows comprises a first row and a second row, and
wherein the detection circuit is configured to:
select a second row output signal from among the plurality of row output signals,
generate a second count result value corresponding to the second row by counting cycles of the clock signal corresponding to a delay time of the second row output signal based on the driving signals,
generate a second difference value between the second count result value and a first count result value corresponding to the first row, and
determine whether the second row is defective by comparing the second difference value with the reference value.

5. The image sensor of claim 4, wherein the detection circuit comprises:
a signal selection circuit configured to select the second row output signal from among the plurality of row output signals;
a counter circuit configured to generate the second count result value by counting cycles of the clock signal in a time interval of the second row output signal;
a difference circuit configured to generate the second difference value that is a difference value between the second count result value and the first count result value; and
a comparison circuit configured to output a result value according to a result of comparing the second difference value with the reference value.

6. The image sensor of claim 5, wherein the image sensor is configured to output the result value corresponding to a fail based on the second difference value being greater than the reference value.

7. The image sensor of claim 5, wherein the signal selection circuit comprises a multiplexer, and wherein the multiplexer is configured to receive the plurality of row output signals and select the second row output signal.

8. The image sensor of claim 5, wherein the counter circuit is configured to:

receive the clock signal, the driving signals and the second row output signal, and generate the second count result value by counting cycles of the clock signal corresponding to a time when the second row output signal is delayed compared to the driving signals.

9. The image sensor of claim 5, further comprising a register configured to store the second count result value generated by the counter circuit, wherein the difference circuit is configured to receive the first count result value and the second count result value output from the register, and generate the second difference value which is an absolute value of a difference between the first count result value and the second count result value.

10. The image sensor of claim 5, wherein the comparison circuit is further configured to receive the second difference value and the reference value, and determine whether the second difference value is greater than the reference value, and wherein the reference value is one of a value input from outside or a value stored in the comparison circuit.

11. The image sensor of claim 1, wherein the pixel array is provided in a first semiconductor layer, and wherein the row driver, the detection circuit, and the timing controller are provided in a second semiconductor layer located below the first semiconductor layer.

12. An image sensor comprising:

a pixel array comprising a pixel area and a dummy area, the pixel area comprising a plurality of pixels;

a row driver configured to output a driving signal to the pixel array; and a detection circuit configured to receive a plurality of row output signals from the dummy area, and receive the driving signal and a clock signal, wherein the detection circuit comprises:

a signal selection circuit configured to select an Nth row output signal from among the plurality of row output signals;

a counter circuit configured to generate an Nth count result value by counting cycles of the clock signal during a time interval of the Nth row output signal based on the driving signal;

a difference circuit configured to generate an Nth difference value between the Nth count result value and an (N−1)th count result value; and a comparison circuit configured to detect a defect of the Nth row output signal by comparing the Nth difference value with a reference value, and wherein the time interval comprises a delay interval in which the Nth row output signal is delayed based on the driving signal.

13. The image sensor of claim 12, wherein, in the pixel array, the pixel area and the dummy area are provided on a same plane, the dummy area is provided in a second direction of the pixel area, and the row driver is provided in a direction opposite to the second direction of the pixel area.

14. The image sensor of claim 12, wherein the time interval comprises a delay interval that is a difference between the driving signal received by the detection circuit and the Nth row output signal.

15. The image sensor of claim 12, wherein the signal selection circuit comprises a multiplexer, and wherein the multiplexer is configured to receive the plurality of row output signals and select the Nth row output signal from among the plurality of row output signals.

16. The image sensor of claim 12, wherein the detection circuit further comprises a register configured to store the Nth count result value generated by the counter circuit, and wherein the difference circuit is configured to receive the (N−1)th count result value output from the register and the Nth count result value generated by the counter circuit, and generate the Nth difference value which is an absolute value of a difference between the (N−1)th count result value and the Nth count result value.

17. The image sensor of claim 12, wherein the comparison circuit is further configured to:

receive the Nth difference value and the reference value, compare the Nth difference value with the reference value, output the result value corresponding to a pass based on the Nth difference value being less than the reference value, and output the result value corresponding to a fail based on the Nth difference value being greater than the reference value.

18. A method of operating an image sensor, the method comprising:

receiving a driving signal;

receiving a plurality of row output signals;

selecting an Nth row output signal from among the plurality of row output signals;

generating an Nth count result value by counting cycles of a clock signal during a delayed time interval between the driving signal and the Nth row output signal;

generating an Nth difference value between the Nth count result value and an (N−1)th count result value;

comparing the Nth difference value with a reference value; and detecting that the Nth row output signal is faulty based on the Nth difference value being greater than the reference value.

19. The method of claim 18, wherein the generating of the Nth difference value comprises:

outputting the (N−1)th count result value; and subtracting the (N−1)th count result value from the Nth count result value.

20. The method of claim 18, wherein the generating of the Nth count result value comprises counting cycles of the clock signal during a time interval between a rising edge of the driving signal and a rising edge of the Nth row output signal by using a counter circuit.

* * * * *